(12) United States Patent
Nakashima et al.

(10) Patent No.: US 7,066,600 B2
(45) Date of Patent: Jun. 27, 2006

(54) PROJECTION TYPE IMAGE DISPLAY APPARATUS

(75) Inventors: Tsutomu Nakashima, Yokohama (JP); Satoshi Ouchi, Kamakura (JP); Taro Imahase, Fujisawa (JP); Tomohiro Miyoshi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/150,297

(22) Filed: Jun. 13, 2005

(65) Prior Publication Data

US 2005/0237489 A1    Oct. 27, 2005

Related U.S. Application Data

(63) Continuation of application No. 10/633,597, filed on Aug. 5, 2003, now Pat. No. 6,910,773.

(30) Foreign Application Priority Data

Aug. 5, 2002    (JP)    ............... 2002-226806
Dec. 20, 2002    (JP)    ............... 2002-369172

(51) Int. Cl.
    *G03B 21/14*    (2006.01)
    *G02F 1/1335*    (2006.01)
    *G02B 5/30*    (2006.01)

(52) U.S. Cl. ............... 353/20; 353/31; 353/34; 353/81; 353/84; 349/9; 349/98; 348/752; 348/757; 359/487; 359/497; 359/502; 359/634; 362/19

(58) Field of Classification Search .......... 353/20, 353/21, 30, 31, 34, 37, 38, 81, 84, 98, 99, 353/122; 349/5, 6, 8, 9, 62, 98, 194; 348/751, 348/752, 756, 757, 760; 359/485, 487, 494, 359/495, 497, 502, 627, 629, 631, 634, 638; 362/19

See application file for complete search history.

(56) References Cited

U.S. PATENT DOCUMENTS

| | | | |
|---|---|---|---|
| 6,234,634 B1 | 5/2001 | Hansen et al. | |
| 6,511,183 B1 | 1/2003 | Shimizu et al. | |
| 6,661,475 B1 | 12/2003 | Stahl et al. | |
| 6,666,557 B1 * | 12/2003 | Choi | 353/31 |
| 6,669,344 B1 | 12/2003 | Ishii | |
| 2003/0227597 A1 | 12/2003 | Silverstain et al. | |
| 2004/0169824 A1 * | 9/2004 | Newell et al. | 353/30 |

OTHER PUBLICATIONS

ProFlux MicroWire™ Technology, "Optical Flat Polarizing Beam Splitters", MOXTEK, Catalog No. PBF02A, May 2002.

* cited by examiner

*Primary Examiner*—W. B. Perkey
*Assistant Examiner*—Rochelle Blackman
(74) *Attorney, Agent, or Firm*—McDermott Will & Emery LLP

(57) ABSTRACT

Disclosed is a compact, light, inexpensive reflection type liquid crystal projector optical unit or reflection type liquid crystal projector which provides high brightness without contrast deterioration caused by light leakage associated with black image display. The unit or projector uses, as a polarizer/analyzer for a reflection liquid crystal panel, a reflection polarizing plate which functions as a polarizing plate by its grating function only in a specific direction. It also uses an auxiliary polarizer and an absorption auxiliary analyzer. Their reflection axis or absorption axis is adjusted according to the characteristic of the reflection liquid crystal panel so as to minimize light leakage associated with black image display.

6 Claims, 17 Drawing Sheets

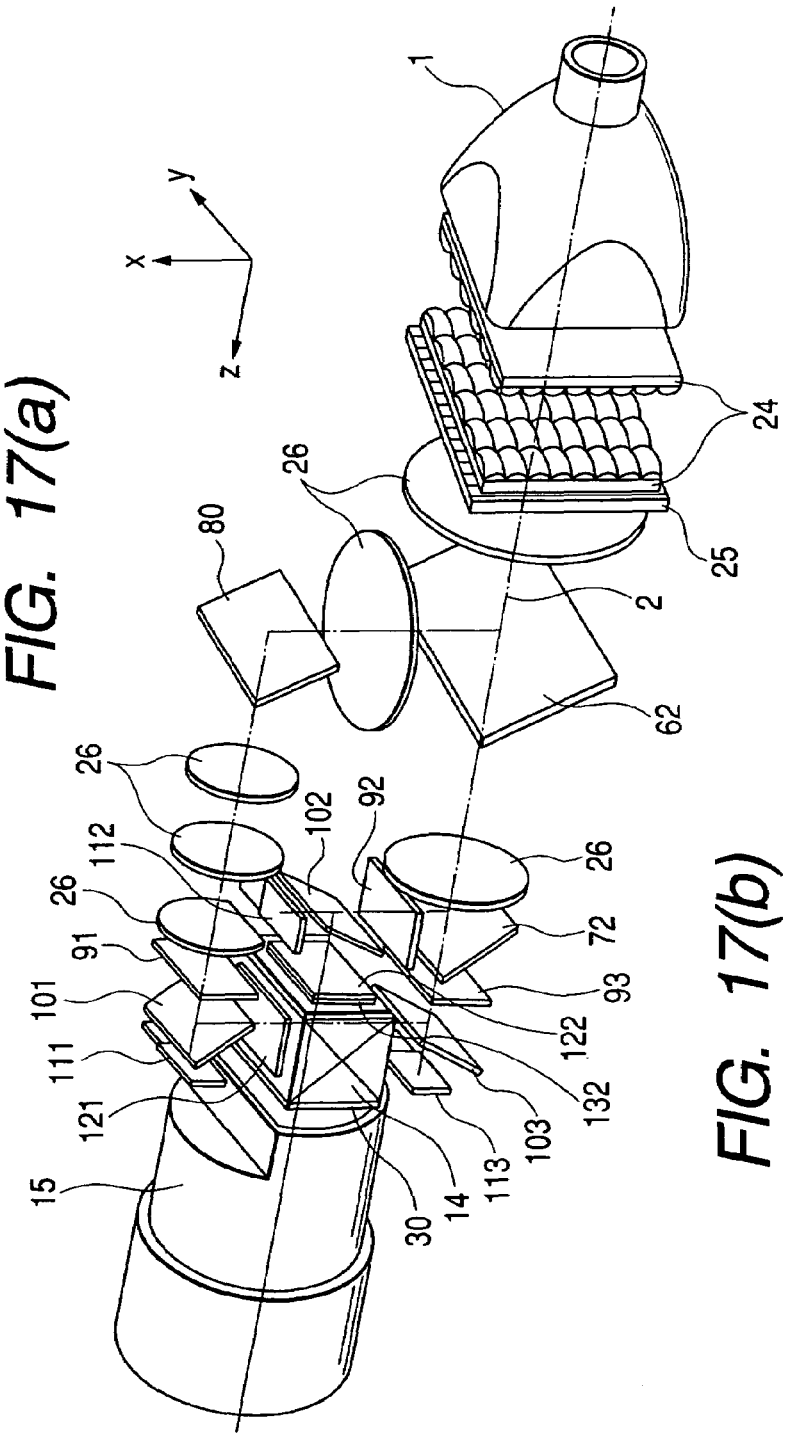

PROJECTION TYPE IMAGE DISPLAY APPARATUS

CROSS REFERENCE TO RELATED APPLICATIONS

This application is a continuation of application Ser. No. 10/633,597, filed on Aug. 5, 2003, now U.S. Pat. No. 6,910,773, entitled PROJECTION TYPE IMAGE DISPLAY APPARATUS, which is hereby incorporated by reference in its entirety.

BACKGROUND OF THE INVENTION

The present invention relates to an optical unit which modulates the intensity of a light beam from an illumination optical system by the polarization function of a reflection image display device to make an optical image and projects the image on a screen through a projection optical system, and a projection type image display apparatus which uses the unit.

A popularly known projection type image display apparatus is a projector which has an optical unit housed in a case together with power supply circuitry and image drive circuitry where the optical unit makes an optical image by light intensity modulation and projects the image on a screen through a projection lens. Here, light intensity modulation refers to a process where light from a light source is polarized to change the shading of each picture element according to image signal through a light valve device.

When a reflection liquid crystal panel is used as a light valve device, usually a polarizing beam splitter prism (hereinafter called a PBS prism) is used as a polarizer/analyzer. A relatively inexpensive PBS prism has a dielectric multilayer film which transmits p-polarized light and reflects s-polarized light (the multilayer film is hereinafter called the PBS film).

When a PBS prism is used as a polarizer/analyzer, a reflection type liquid crystal projector requires a quarter-wave plate for reducing light leakage from the PBS prism for black image in order to increase the contrast. However, even when the quarter-wave plate is used, its effect is not satisfactory.

Generally, a quarter-wave plate has wavelength and angle characteristics. Therefore, as the difference of the incident light wavelength from the design center wavelength increases or the incidence angle increases, the quarter-wave plate performance decreases. In a reflection type liquid crystal projector in which the light impinging on the reflection liquid crystal panel has a certain wavelength range and a certain angle range, the effect of reducing leakage of all incident light is not perfect.

A conventional method of preventing this leak light from being projected on the screen is to place a polarizing plate between the PBS prism and the projection lens. However, it is impossible to prevent light leakage completely because the leak light includes rays polarized in the same direction as the direction of the polarizing plate transmission axis.

Besides, the use of the PBS prism is disadvantageous from the viewpoint of weight reduction. Furthermore, the PBS prism must use a glass material whose photoelastic coefficient is low because it is necessary to avoid deterioration in contrast which might be caused by light leakage due to polarized light turbulence in transmission of rays through the glass. However, generally such a glass material has a large specific gravity and is expensive because it is not widely available on the market.

In order to solve the above problems, a reflection type polarizing plate may be used as a polarizer/analyzer, as described in U.S. Pat. No. 6,234,634 or catalog No. PBF02A of Moxtek (US). This type of reflection polarizing plate functions as a polarizing plate on a condition that the optical diffraction grating reflects polarized light rays parallel to the grating and transmits polarized light rays perpendicular to it.

Therefore, this structure eliminates the possibility of oblique leak light, which might occur in a PBS prism-based structure, and thus theoretically provides higher contrast than the PBS prism-based structure.

SUMMARY OF THE INVENTION

In the above US Patent, there is no reference to color image display. Also, although the above catalog describes a color wheel as a means to display a color image, the ratio of loss of light passing through the color wheel is 2/3 or so and the light utilization efficiency is low, so that sufficient brightness is not obtained unless a high power lamp is used. Also, since it uses a reflection polarizing plate as an auxiliary analyzer, ghost may appear in the image. Besides, the contrast is not satisfactory and should be improved.

The present invention has been made in view of the above problems and aims at providing a light, compact optical unit which uses a reflection image display device to provide satisfactory brightness, high contrast and good image quality performance such as high resolution, and a reflection type image display apparatus which uses the unit.

In order to solve the above problems, as one preferred aspect, the invention provides a projection type image display apparatus comprising a light source, an illumination optical system, a reflection image display device, and a projection lens, and its constitution is as follows. The apparatus has, as polarizers/analyzers for the reflection image display device: a reflection polarizing plate which functions as a polarizing plate by diffraction; and at least either of an auxiliary polarizer which is located between the light source and the reflection polarizing plate in a light path and an auxiliary analyzer as an absorption polarizing plate which functions as an analyzer located between the reflection polarizing plate and the projection lens in the light path. Here, image light reflected by the reflection image display device is cast on the working plane of the reflection polarizing plate and then reflected by the reflection polarizing plate before reaching the projection lens and in the light path, the reflection polarizing plate is located just before/after the reflection image display device.

BRIEF DESCRIPTION OF THE DRAWINGS

The invention will be more particularly described with reference to the accompanying drawings, in which:

FIG. 17A shows the structure of a reflection type liquid crystal projector optical unit according to a fourteenth embodiment of the present invention and FIG. 17B shows the incidence plane of a projection lens; and Table 1 shows the results of measurements of polarizing axis angles of reflection liquid crystal panels and the results of calculations of polarizing axis adjustment angles.

DETAILED DESCRIPTION OF THE PREFERRED EMBODIMENTS

Figure 1:
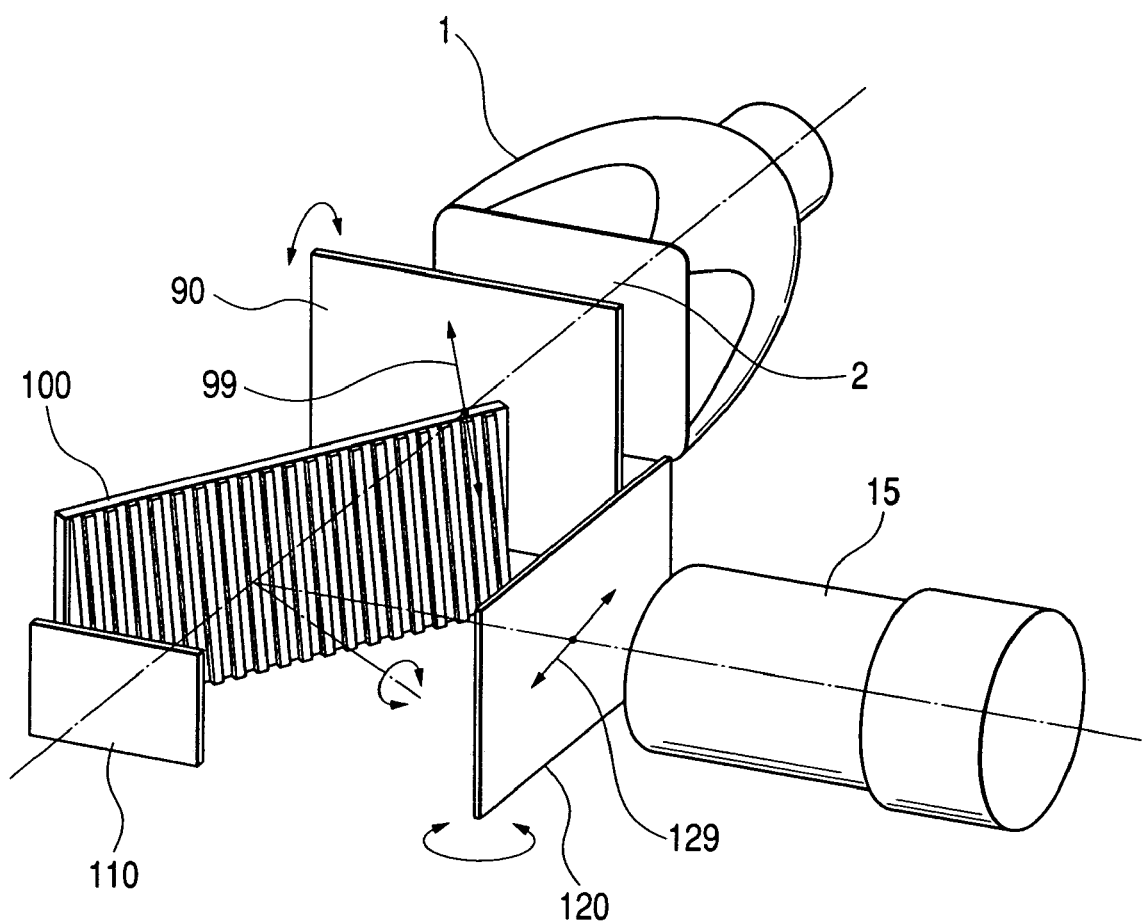
FIG. 1 shows the structure of a reflection type liquid crystal projector optical unit according to a first embodiment of the present invention.

Preferred embodiments of the present invention will be described referring to the accompanying drawings. The components which are common among all the drawings are marked with the same reference numerals and once a component is explained, the explanation will not be repeated.

FIG. 1 shows a projector optical unit according to an embodiment of the present invention.

In FIG. 1, numeral 1 represents a light source; 2 the optical axis of a reflection type liquid crystal projector optical unit; 90 an auxiliary polarizer for white; 100 a reflection polarizing plate for white; 110 a reflection liquid crystal panel for white; 120 an auxiliary analyzer for white; and 15 a projection lens.

An explanation is made below with reference to FIG. 1 about how a reflection type liquid crystal projector optical unit in the present invention works.

For white image display, the operational sequence is as follows. As illustrated in FIG. 1, rays from the light source 1 which are polarized perpendicularly to the absorption or reflection axis 99 of the auxiliary polarizer 90 pass through the auxiliary polarizer 90 and reach the reflection polarizing plate 100. Since the reflection axis 99 of the reflection polarizing plate 100 is almost parallel to the absorption or reflection axis of the auxiliary polarizer 90, the rays which have reached the reflection polarizing plate 100 pass through the reflection polarizing plate 100 and reach the reflection liquid crystal panel 110. Generally, when white image signal is received, the reflection liquid crystal panel 110 rotates polarized incident light approx. 90 degrees when reflecting it, so that the polarization direction of the rays reflected by the reflection liquid crystal panel 110 is almost parallel to the reflection axis of the reflection polarizing plate 100. Therefore, the rays reflected by the reflection liquid crystal panel 110 reach the auxiliary analyzer 120 after their optical axis is rotated 90 degrees and reflected by the reflection polarizing plate 100. Since the absorption axis 129 of the auxiliary analyzer 120 is almost perpendicular to the reflection axis of the reflection polarizing plate 100, the rays reflected by the reflection polarizing plate 100 pass through the auxiliary analyzer 120. The rays which have passed through the auxiliary analyzer 120 pass through the projection lens 15 to reach the screen (not shown) on which a white image is displayed.

For black image display, the operational sequence is as follows. The sequence is the same as in the case of white image display until the rays reach the reflection liquid crystal panel 110. Generally, when black image signal is received, the reflection liquid crystal panel 110 reflects the incident light without altering their polarization state, so that the polarization direction of the rays reflected by the reflection liquid crystal panel 110 remains the same as before they reach the panel 110. Therefore, the rays reflected by the reflection liquid crystal panel 110 pass through the reflection polarizing plate 100, then through the auxiliary polarizer 90 and go back to the light source 1. Consequently no rays reach the screen, which means that a black image is displayed.

Usually, contrast is evaluated in terms of a contrast ratio which expresses white image illuminance versus black image illuminance. It is generally thought that the higher the contrast ratio is, the higher the image quality is. If the reflection polarizing plate 100 and reflection liquid crystal panel 110 should be ideal in their performance, the contrast ratio would be infinite. However, actually, in black image display, light leakage occurs with the reflection polarizing plate 100 and reflection liquid crystal panel 110, resulting in contrast deterioration.

The method of reducing light leakage in black image display according to this embodiment is explained below.

First, let's look at the reflection polarizing plate 100. A regular polarizing plate (polarizing film) performs its function by means of an array of dichroic molecules; it transmits polarized rays perpendicular to the array of molecules and absorbs polarized rays parallel to the array. On the other hand, a reflection polarizing plate, which functions as a polarizing plate by its grating function in a specific direction only, reflects polarized rays parallel to the grating and transmits polarized rays perpendicular to the grating. Therefore, regarding light transmission, both types of polarizing plates are basically not different in polarization characteristics. Both types have the same characteristic: for example, the contrast ratio is almost equal in regard to any light rays on a plane including the polarizing plate's transmission axis and its normal and on a plane including the polarizing plate's absorption or reflection axis and its normal.

In a typical reflection polarizing plate, the reflection axis is parallel to the s-polarization direction with respect to the optical axis beam and, when s-polarized rays with respect to the optical axis beam are reflected and p-polarized rays are transmitted, the degree of polarization of transmitted or reflected light is the highest. Therefore, this embodiment is so structured.

If a PBS prism is employed, leak light from the prism contains the same polarized component as in the direction of the transmission axis of the polarizing plate and thus it is impossible to prevent light leakage completely even when a polarizing film (analyzer) is placed between the projection lens and the reflection liquid crystal panel. On the other hand, when the reflection polarizing plate 100 is employed, light leakage often occurs due to a low contrast ratio of the plate 100; therefore, the use of the auxiliary polarizer 90 and the auxiliary analyzer 120 prevents most of light leakage, leading to a higher contrast.

If the beam impinging on the liquid crystal panel corresponds to, for example, F2.5, the contrast ratio which is provided by the optical unit only (measured using a mirror in place of the reflection liquid crystal panel) is in the range from 5,000 to 15,000 with a reflection polarizing plate while it is from 500 to 2,000 with a PBS prism.

In this structure, the reflection plane of the reflection polarizing plate 100 is on the reflection liquid crystal panel 110 side and rays reflected from the reflection liquid crystal panel 110 do not pass through the transparent parallel plain plate which is the base of the reflection polarizing plate 100. Hence, no astigmatism occurs and there is no deterioration in resolution.

Next, light leakage attributable to the performance of the reflection polarizing plate 100 is explained concretely.

It is ideal that the reflection polarizing plate 100 is perfect in its polarization/separation function, namely it completely reflects polarized rays parallel to the grating and completely transmits polarized rays perpendicular to the grating. However, in reality, it is not so. For this reason, even when the reflection polarizing plate 100 is placed as a polarizer to pick up the polarized component perpendicular to the reflection axis, out of non-polarized rays from the light source 1 (see FIG. 1), some small polarized component parallel to the reflection axis is transmitted and thus cast on the reflection liquid crystal panel 110 as well. In black image display, this small polarized component parallel to the reflection axis is reflected by the reflection liquid crystal panel 110 while its polarization direction remains unchanged, and, as a consequence, reflected by the reflection polarizing plate 100; then it passes through the projection lens 15 and reaches the screen (not shown) ending up as light leakage. In order to prevent such light leakage, the auxiliary polarizer 90 is placed between the light source 1 and the reflection polarizing plate 100 with its reflection or absorption axis parallel to the reflection axis of the reflection polarizing plate 100, so as to attenuate the polarized component parallel to the reflection axis of the reflection polarizing plate 100. Since the use of the auxiliary polarizer 90 means that rays impinging on the reflection liquid crystal panel 110 pass through two polarizers, all the polarized component becomes almost perpendicular to the reflection axis, so that the amount of light (leakage) which is, after being by the reflection liquid crystal panel 110, reflected by the reflection polarizing plate 100 and goes toward the projection lens 15 can be reduced.

However, even if incident light on the reflection liquid crystal panel 110 all consists of polarized rays almost perpendicular to the reflection axis because of the use of the auxiliary polarizer 90, as the rays reflected from the reflection liquid crystal panel 110 pass through the reflection polarizing plate 100, some of the polarized component perpendicular to the reflection axis is reflected. This reflected light passes through the projection lens 15 and reaches the screen (not shown) ending up as light leakage. In order to prevent such light leakage, the auxiliary analyzer 120 is placed between the reflection polarizing plate 100 and the projection lens 15 with its absorption axis perpendicular to the reflection axis of the reflection polarizing plate 100. Because of the use of the auxiliary analyzer 120, as the rays reflected from the reflection liquid crystal panel 110 pass through the reflection polarizing plate 100, the small polarized component perpendicular to the reflection axis cannot pass through the auxiliary analyzer 120, thereby reducing light leakage.

The above discussion is based on assumption that the reflection polarizing plate 100 is not ideal; if it delivers ideal performance, the auxiliary polarizer 90 and the auxiliary analyzer 120 are not needed. In a currently available common reflection polarizing plate, the ratio of the quantity of transmitted light (cause of leakage) to the quantity of reflected light for polarized incident light parallel to the grating is smaller than the ratio of the quantity of reflected light (cause of leakage) to the quantity of transmitted light for polarized incident light perpendicular to the grating. Therefore, if the currently available type reflection polarizing plate 100 is used and image light from the reflection liquid crystal panel 110 is reflected by the plate 100 and cast on the projection lens 15, the auxiliary polarizer 90 may be no longer needed. On the other hand, if the currently available type reflection polarizing plate 100 is used and image light from the reflection liquid crystal panel 110 is transmitted by the plate 100 and cast on the projection lens 15, the auxiliary analyzer 120 may be no longer needed.

Next, light leakage attributable to the performance of the reflection liquid crystal panel 110 is explained concretely.

For black image display, it is ideal that the reflection liquid crystal panel 110 reflects incident light while keeping its polarization state unchanged; however, actually it reflects incident light while slightly altering its polarization direction. When this light is then reflected by the reflection polarizing plate 100, some polarized component is generated and transmitted through the auxiliary analyzer 120, ending up as light leakage.

In order to prevent this light leakage, the reflection liquid crystal panel 110 should reflect incident light without altering its polarization direction. It has been found that when incident light is polarized in a certain direction, the reflection liquid crystal panel 110 causes virtually no alteration in the polarization direction of light which it reflects. This polarization direction is several degrees off the direction perpendicular to the reflection axis of the reflection polarizing plate 100. The reflection polarizing plate 100 demonstrates the highest polarization/separation performance when its reflection axis is parallel to the normal of the main incidence plane (called for distinguishing this plane from other light incidence planes) including the normal of the reflection polarizing plate 100 and its optical axis. Thus, usually, the reflection polarizing plate 100 is arranged at above-described angle. So the light passing through the reflection polarizing plate 100 is polarized perpendicularly to the reflection axis of the reflection polarizing plate 100 and this polarization direction is different from the polarization direction of the incident light reflected by the reflection liquid crystal panel 110 without polarization direction alteration.

Accordingly, in order to reduce light leakage attributable to the performance of the reflection liquid crystal panel 110, light impinging on the reflection liquid crystal panel 110 should be reflected by the reflection liquid crystal panel 110 while its polarization direction remains unchanged. To realize this, the reflection axis of the reflection polarizing plate 100 should be rotated on the working plane of the reflection polarizing plate 100 so that light is reflected by the reflection liquid crystal panel 110 while its polarization direction remains unchanged.

However, the polarization direction of incident light which the reflection liquid crystal panel 110 does not alter when reflecting light varies depending on the type of reflection liquid crystal panel 110, and even in the same type of reflection liquid crystal panel 110, there is some difference among individual panels. This means that there should be a mechanism to adjust the rotation angle of the reflection axis of the reflection polarizing plate 100 for each reflection liquid crystal panel 110.

When the reflection axis of the reflection polarizing plate 100 is rotated on its working plane so as to be off the normal of the main incidence plane including its normal and optical axis, the polarization/separation performance may deteriorate but the plate is rotated very slightly, the extent of performance deterioration is very small and its influence is negligible.

Furthermore, it is better to rotate the absorption or reflection axis of the auxiliary polarizer 90 and the absorption axis of the auxiliary analyzer 120 as well according to the direction of the reflection axis of the reflection polarizing plate 100. The auxiliary polarizer 90 should be rotated on its working plane so that its reflection or absorption axis and the reflection axis of the reflection polarizing plate 100 become nearly parallel to each other as viewed from the auxiliary polarizer 90 side, and also a mechanism to make an adjustment for each reflection liquid crystal panel 110 should be provided. The auxiliary analyzer 120 should be rotated on its working plane so that its absorption axis and the transmission axis of the reflection polarizing plate 100 (axis perpendicular to the reflection axis on the working plane of the reflection polarizing plate 100) become nearly parallel to each other as viewed from the auxiliary analyzer 120 side, and also a mechanism to make an adjustment for each reflection liquid crystal panel 110 should be provided. When the absorption/reflection axes of the auxiliary polarizer 90, the reflection polarizing plate 100, and the auxiliary analyzer 120 are rotated beforehand according to the type of reflection liquid crystal panel 110 as suggested in this embodiment, the required adjustment range or amount for the adjustment mechanism may be decreased; so if the reflection liquid crystal panel 110 is of the standard type, contrast can be improved without any axis angle adjustment of the reflection liquid crystal panel 110.

Table 1 shows rotation angle data for black image display concerning some types of reflection liquid crystal panels 110. The table includes measurements of the angle of the polarization direction (called the panel polarization axis angle) of incident light which the reflection liquid crystal panel 110 reflects without altering the incident light polarization direction, with respect to the longer side of the image display area of the reflection liquid crystal panel 110. The table also includes the following calculation results. When the reflection axis of the reflection polarizing plate 100 is rotated in a way for polarized light with that angle to be cast on the panel, the absorption or reflection axis of the auxiliary polarizer and the absorption axis of the auxiliary analyzer are rotated on the working plane by some degrees so as to minimize the angle difference between the reflection axis and the absorption or reflection axis of the auxiliary polarizer 90, and the angle difference between the reflection axis and the transmission axis of the auxiliary analyzer 120. These rotation angles (called the polarizer axis adjustment angle and the analyzer axis adjustment angle) are calculated and listed in Table 1.

TABLE 1

| | (in degrees) | | |
|---|---|---|---|
| Sample No. | Panel polarization axis angle | Polarizer axis adjustment angle | Analyzer axis adjustment angle |
| Sample 1 | 5.3 | 3.8 | 7.5 |
| Sample 1 | 5.4 | 3.8 | 7.6 |
| Sample 3 | 2.4 | 1.7 | 3.4 |
| Sample 4 | 4.1 | 2.9 | 5.8 |
| Sample 5 | 4.1 | 2.9 | 5.8 |
| Sample 6 | 2.8 | 2.0 | 4.0 |
| Average | 4.0 | 2.8 | 5.7 |
| Standard deviationΣ | 1.2 | 0.9 | 1.7 |
| 6Σ | 7.4 | 5.3 | 10.5 |

As obvious from Table 1, the panel polarization axis angles are less than 6 degrees an the polarizer axis adjustment angles are less than 4 degrees and the analyzer axis adjustment angles are less than 8 degrees. When the angle of rotation is within these ranges, the reflection liquid crystal panel 110 reflects incident light without altering its polarization direction for black image.

In this embodiment, an absorption polarizing plate is used as the auxiliary analyzer 120 to prevent appearance of ghost and improve contrast. The following is the rationale behind that.

Polarized light rotated approx. 90 degrees depending on a white image picture element is reflected by the reflection polarizing plate 100 and cast on the auxiliary analyzer 120. When the auxiliary analyzer 120 is a reflection polarizing plate, it reflects a small portion of the polarized light perpendicular to the grating which it should completely transmit, as mentioned earlier. Hence, this small portion of light is reflected by the auxiliary analyzer 120 and then reflected by the reflection polarizing plate 100 and cast again on the reflection liquid crystal panel 110 (re-incidence). If this light is not parallel to the optical axis, it is cast on the reflection liquid crystal panel 110 at a position different from the position where it was first cast; and if the picture element in the position of re-incidence is one for black image, it is reflected while its polarization direction is almost kept unchanged. Therefore, this light is reflected by the reflection polarizing plate 100 and transmitted through the auxiliary analyzer 120, then through the projection lens 15 before reaching the screen (not shown). When the auxiliary analyzer 120 is a reflection polarizing plate as mentioned above, picture elements which should not represent an image turn out vague image elements, resulting in ghost. This leads to a deterioration in chess contrast (ANSI contrast). This embodiment uses an absorption polarizing plate as the auxiliary analyzer 120 to prevent it. By doing so, appearance of ghost and chess contrast deterioration can be prevented because the auxiliary analyzer 120 does not reflect incident light.

Even when a black image is displayed on the entire screen, the use of an absorption polarizing plate as the auxiliary analyzer 120 reduces light leakage for the reason stated below, thereby improving contrast. If a reflection polarizing plate is used as the auxiliary analyzer 120 and the polarization direction is disturbed by the reflection liquid crystal panel 110, the polarized component of reflected light from the reflection liquid crystal panel 110 which is parallel to the reflection axis of the reflection polarizing plate 100 is reflected and transmitted through the auxiliary analyzer 120; part of the light is reflected by an optical component (projection lens 15 in this example) which is located after the analyzer, and returns to the analyzer 120. The projection lens 15 is composed of plural lenses and its transmittance is approx. 85%, so that approx. 15% of the rays is reflected by the projection lens 15. Although most of the returning rays are polarized rays which pass through the auxiliary analyzer 120, the reflective auxiliary analyzer 120 reflects some of them, and the reflected rays pass through the projection lens 15, ending up as light leakage. Also, the rays returning from the projection lens 15 are reflected by a lens surface not perpendicular to the optical axis. When the rays are reflected by such a lens surface, the polarization direction is altered, generating a polarized component parallel to the reflection axis of the auxiliary analyzer 120; this polarized component is reflected by the auxiliary analyzer 120 before passing through the projection lens 15, ending up as light leakage. In order to prevent such light leakage, an absorption polarizing plate is used as the auxiliary analyzer 120 in this embodiment. Since the absorptive auxiliary analyzer 120 does not reflect incident light, contrast deterioration can be prevented.

Furthermore, in this embodiment, the reflection polarizing plate 100 is located just before/after the reflection liquid crystal panel 110 so that contrast is improved. If an optical component such as a lens or prism is located between the reflection polarizing plate 100 and the reflection liquid crystal panel 110, contrast deteriorates for the following reason. If it is a lens, rays other than rays along the optical axis are refracted as they pass through the lens. Therefore, for incident light rays whose polarization direction is not parallel or perpendicular to the main incidence plane, their polarization direction is altered, generating a polarized component parallel to the reflection axis of the reflection polarizing plate 100, ending up as light leakage. If it is a prism, there may be birefringence due to residual or thermal stress in the prism glass and as rays pass through the glass, their polarization direction is disturbed. Thus, a polarized component parallel to the reflection axis of the reflection polarizing plate 100 is generated, ending up as light leakage.

As in a transmission liquid crystal panel, contrast may be improved with respect to oblique incident light by using an adequate viewing angle compensation element such as a negative retardation film in a reflection liquid crystal panel as well. The viewing angle compensation element may be located just before or inside the reflection liquid crystal panel. The viewing angle compensation element makes a compensation for the reflection liquid crystal panel and may be considered a component of the panel; so it is not included as an optical component here.

Figure 2:
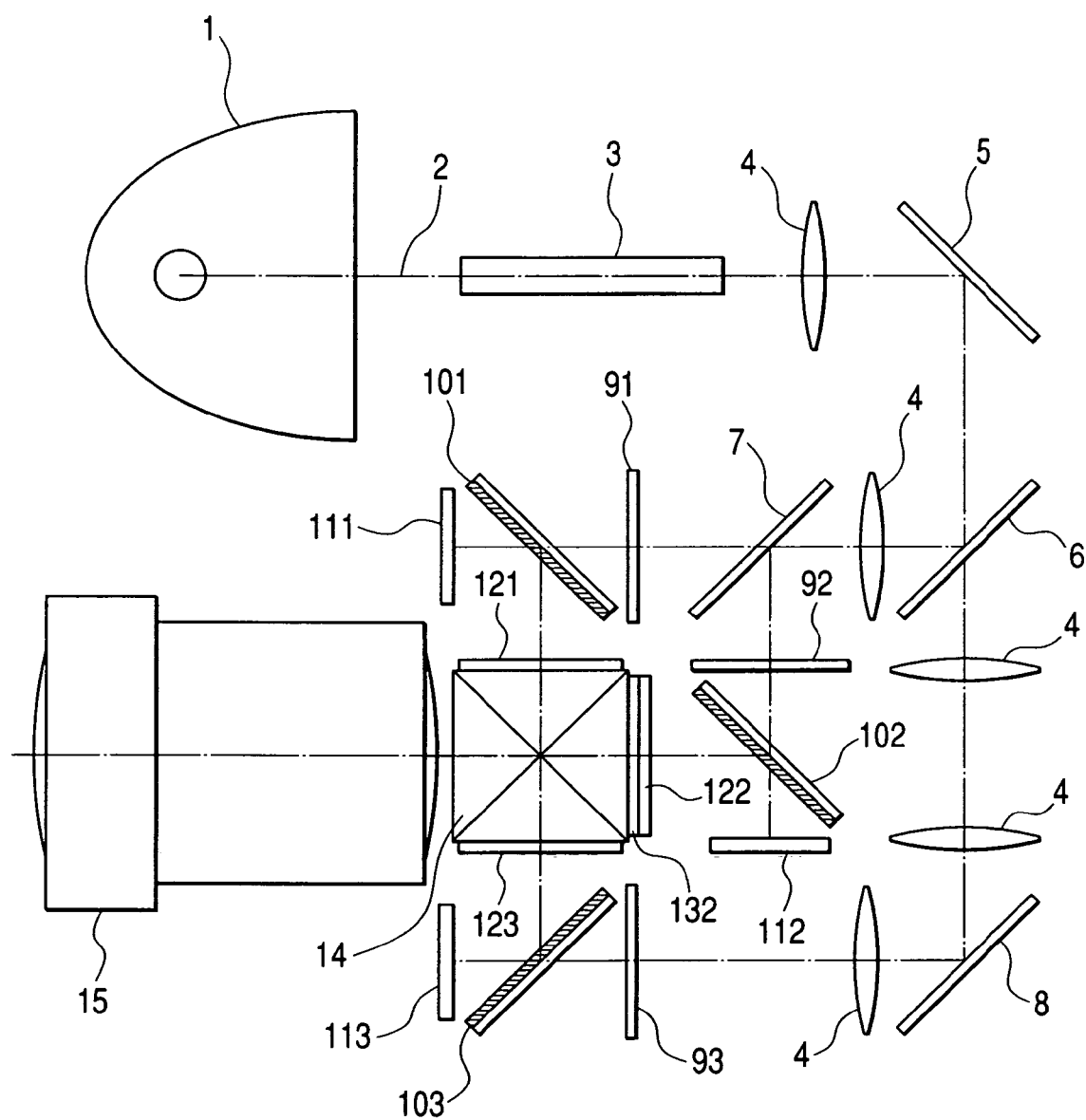
FIG. 2 shows the structure of a reflection type liquid crystal projector optical unit according to a second embodiment of the present invention.

FIG. 2 shows a reflection type liquid crystal projector optical unit according to another embodiment of the present invention. In FIG. 2, numeral 1 represents a light source; 2 the optical axis of a reflection type liquid crystal projector optical unit; and 3 a rod lens which has an integrator function and a polarization conversion function. One example of a polarization converter (not shown) built in the rod lens 3 is as follows: there is a transparent circle in the center of the entrance plane of the rod lens and the remaining area is a total-reflection mirror and the exit plane consists of a lamination of a quarter-wave plate (light source side) and a reflection polarizing plate. Numeral 4 represents focusing lenses which throw the image of the exit opening of the rod lens 3 on reflection liquid crystal panels 111, 112, 113. Numeral 5 represents a white reflection mirror; 6 a B-transmission RG-reflection dichroic mirror; 7 a R-transmission G-reflection dichoric mirror, 8 a B-reflection mirror. 91, 92, and 93 represent auxiliary polarizers for R, G and B respectively and 101, 102, and 103 represent reflection polarizing plates for R, G and B respectively (the hatching represents their working planes). Numerals 111, 112, and 113 represent reflection liquid crystal panels for R, G and B respectively while 121, 122, and 123 represent auxiliary analyzers for R, G and B respectively. Numeral 132 represents a half-wave plate for G; 14 a cross dichroic prism; and 15 a projection lens. The auxiliary polarizers 91, 92, 93 and the auxiliary analyzers 121, 122, 123 are located or formed on transparent parallel plain plates. Here, R, G, and B mean red, green, and blue light, respectively.

Next, referring to FIG. 2, an explanation is given below of how a reflection type liquid crystal projector optical unit according to the present invention works for white image display. The auxiliary polarizers 91, 92, 93, the reflection polarizing plates 101, 102, 103, the reflection liquid crystal panels 111, 112, 113, and the auxiliary analyzers 121, 122, 123 function in the same way as the auxiliary polarizer 90, the reflection polarizing plate 100, the reflection liquid crystal panel 110 and the auxiliary analyzer 120, respectively and an explanation of their details is omitted here.

Referring to FIG. 2, rays coming from the light source 1 pass through the rod lens 3. Since the rod lens has a polarization conversion function, the outgoing rays are p-polarized. The rays which exit the rod lens 3 are bent (rotated) 90 degrees before reaching the B-transmission RG-reflection dichroic mirror 6 where B rays are transmitted and RG rays are reflected. The reflected RG rays reach the R-transmission G-reflection dichroic mirror 7 where R rays are transmitted and G rays are reflected. The transmitted R rays pass through the auxiliary polarizer for R 91 and reach the reflection liquid crystal panel 111. The reflected G rays from the R-transmission G-reflection dichroic mirror 7 pass through the auxiliary polarizer for G 92 and reach the reflection liquid crystal panel for G 112. The B rays which have passed through the B-transmission RG-reflection dichroic mirror 6 are bent 90 degrees by the B-reflection mirror 8 and transmitted through the auxiliary polarizer for B 93, then through the reflection polarizing plate for B 103 before reaching the reflection liquid crystal panel for B 113. The light is thus color-separated into R, G and B light rays. When the rays are reflected by the reflection liquid crystal panel for R 111, reflection liquid crystal panel for G 112 and reflection liquid crystal panel for B 113, the polarized rays are rotated 90 degrees and become s-polarized rays. They are respectively reflected by the reflection polarizing plate for R 101, reflection polarizing plate for G 102, and reflection polarizing plate for B 103 and bent 90 degrees. Then they pass through the auxiliary analyzer for R 121, auxiliary analyzer for G 122 and auxiliary analyzer for B 123, respectively and G rays pass through the half-wave plate for G 132 and become p-polarized. The R, G, and B rays reach the cross dichroic prism 14. The R, G, and B rays are combined by the prism 14 (become white) and projected on the screen (not shown) in enlarged form by the projection lens 15.

Needless to say, the auxiliary polarizers 91, 92, 93 located before the reflection liquid crystal panels 101, 102, 103 may be omitted if the reflection liquid crystal panels 101, 102, 103 have sufficiently high performance and the possibility of light leakage is small.

In the above case, the rod lens 3 is used as an integrator; however, the present invention is not limited thereto. It is obvious that a light pipe, multi-lens or the like may be used instead. In the above case, in the light path, white light from the light source is first separated into RG light and B light before the RG light is separated into R light and G light. However, it is also acceptable that white light is separated into R light and GB light before the GB light is separated into G light and B light.

In this embodiment, the light source 1 uses a white lamp such as an ultra-high pressure mercury lamp, metal halide lamp, xenon lamp, mercury xenon lamp or halogen lamp. These lamps contain wave components which deteriorate the R, G, and B colors; and because the rays which reach the dichroic mirrors are not telecentric, the wavelength of transmitted or reflected rays differs depending on the position where incident light is cast, causing color unevenness. To prevent this, it is desirable that the base plates of the auxiliary polarizers are dichroic-coated to remove unwanted wave components.

In this embodiment, since the working planes of the reflection polarizing plates 101, 102, 103 are on the side of the reflection liquid crystal panels 111, 112, 113, rays reflected by these panels do not pass through the transparent parallel pain plates (base plates) of the reflection polarizing plates 101, 102, 103. Therefore, no astigmatism occurs and no resolution deterioration results.

In addition, since this structure employs only the cross dichroic prism 14 as a prism, the optical unit can be as lightweight as a transmission type liquid crystal projector optical unit.

If a color wheel should be used as the color separation optical system here, according to the color display process by the color wheel, white image display would be achieved by time-division of one reflection liquid crystal panel where R, G and B components are displayed at high speed. In this process, while one color is displayed, the other two colors are not projected and discarded. On the other hand, in this structure, all three colors are projected at the same time for white image display so that higher light utilization efficiency and more brightness are assured.

There is a tradeoff between contrast and transmittance regarding the polarization converter (not shown) in the rod lens 3, the auxiliary polarizers 91, 92, 93, reflection polarizing plates 101, 102, 103, and auxiliary analyzers 121, 122, 123. In other words, as contrast is increased, transmittance is decreased, and vice versa. This implies a tradeoff between contrast and brightness in terms of projection type image display apparatus performance.

This embodiment uses a plurality of components: the polarization converter (not shown) in the rod lens 3, auxiliary polarizers 91, 92, 93, reflection polarizing plates 101, 102, 103, and auxiliary analyzers 121, 122, 123. In accordance with the rule mentioned below, these optical components may be combined so as to assure high efficiency and high contrast in the projection type image display apparatus.

The contrast ratio of an optical system is calculated from the following formula:

1/(optical system contrast ratio)=1/(optical system contrast ratio on the panel entrance side)+1/ (optical system contrast ratio on the panel exit side)

This formula indicates that high efficiency cannot be achieved even if only the optical system contrast ratio on the panel entrance or exit side is improved. Balancing between the entrance side and exit side is the best way to optimize both brightness and contrast.

The optical system contrast ratio is calculated as the product of contrast ratios of components. Let's assume that the contrast ratio of the polarization converter (not shown) in the rod lens 3 is A; that of the auxiliary polarizers 91, 92, 93 is B; that of the auxiliary analyzers 121, 122, 123 is E; and the transmission contrast ratio and reflection contrast ratio of the reflection polarizing plates 101, 102, 103 are C and D, respectively. In the structure where reflected rays from the reflection liquid crystal panels 101, 102, 103 are reflected by the reflection polarizing plates 101, 102, 103 before reaching the projection lens 15 as in this embodiment, the entrance side optical system contrast ratio is calculated by A*B*C while the exit side optical system contrast ratio is calculated by D*E. Alternatively, as will be later explained in connection in FIG. 8, in the structure where reflected rays from the reflection liquid crystal panels 111, 112, 113 pass through the reflection polarizing plates 101, 102, 103 before reaching the projection lens 15, the entrance side optical system contrast ratio is calculated by A*B*D while the exit side optical system contrast ratio is calculated by C*E.

Therefore, for the sake of balancing, the polarization converter (not shown) in the rod lens 3, auxiliary polarizers 91, 92, 93, auxiliary analyzers 121, 122, 123, and reflection polarizing plates 101, 102, 103 should meet the following relation, in the structure according to this embodiment:

$A*B*C=(0.5-5)*D*E$, and in the structure where reflected rays from the reflection liquid crystal panels 111, 112, 113 pass through the reflection polarizing plates 101, 102, 103 before reaching the projection lens 15:

$A*B*C-(0.5-5)D*E$.

When the polarization converter (not shown) in the rod lens 3, or the auxiliary polarizers 91, 92, 93, or the auxiliary analyzers 121, 122, 123 are not used, the above relations should be met where 1 should be substituted for their contrast ratio.

Figure 3A:
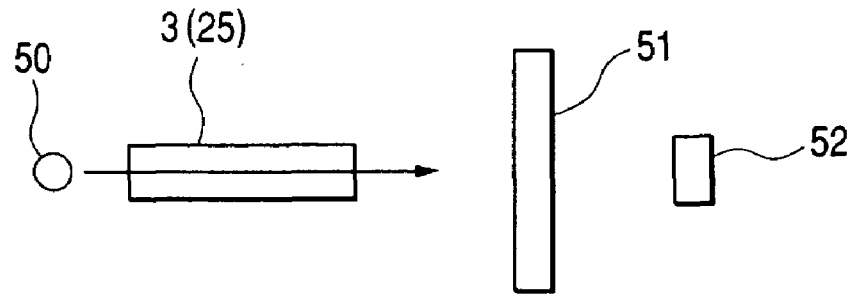
FIG. 3A shows a method of measuring the contrast ratio of a polarizing converter.

FIG. 3A shows a method of measuring the contrast ratio of a polarization converter. As shown in FIG. 3A, a measuring light source 50 emits light. Due to an aperture behind the light source 50, the divergence of the beam which reaches the object to be measured is expressed as nearly F20 and the beam is non-polarized (random polarized). Located after the light source are the polarization converter 25 in the rod lens 3, a measuring polarizing plate 51 (desirably with the highest possible degree of polarization) and a measuring light receiver 52. The light coming from the light source 50 passes through the polarization converter 25 in the rod lens 3 and the measuring polarizing plate 51 and reaches the measuring light receiver 52 where the optical brightness of the transmitted light is measured. The transmittance of the object can be calculated using "reference measurement," a measuring process where the brightness is measured without the object (polarization converter 25 in the rod lens 3). The transmittance of the polarization converter 3 (25) is calculated using the following formula:

Transmittance of the polarization converter 25= (brightness by measurement with the object)/ (brightness by reference measurement)/2

In the above formula, the reason for the introduction of the division by 2 (/2) is as follows: ideally the polarization converter 25 should completely polarize/convert incident light and its brightness should be twice as much as the brightness obtained by reference measurement.

For calculation of a contrast ratio, the transmittance should be calculated in the following two modes. One mode is that the reflection axis of the PBS film in the polarization converter as the object or the reflection polarizing plate is parallel to the absorption axis (or reflection axis) of the measuring polarizer (parallel mode) and the other is that the reflection axis of the PBS film in the polarization converter as the object or the reflection polarizing plate is perpendicular to the absorption axis (or reflection axis) of the measuring polarizer (perpendicular mode). The contrast ratio is calculated using the following formula:

Contrast ratio=(transmittance in the parallel mode)/(transmittance in the perpendicular mode)

Brightness is calculated by multiplying the spectral distribution of measured transmittances by spectral luminous efficacy. Hence, theoretically brightness is calculated by wavelength integration $\int T(\lambda)^*A(\lambda)d\lambda$ where transmittance and spectral luminous efficacy in the wavelength band used are respectively expressed as $T(\lambda)$ and $A(\lambda)$. In case of reflection, reflectance $R(\lambda)$ should be used instead of transmittance $T(\lambda)$.

Figure 3B:
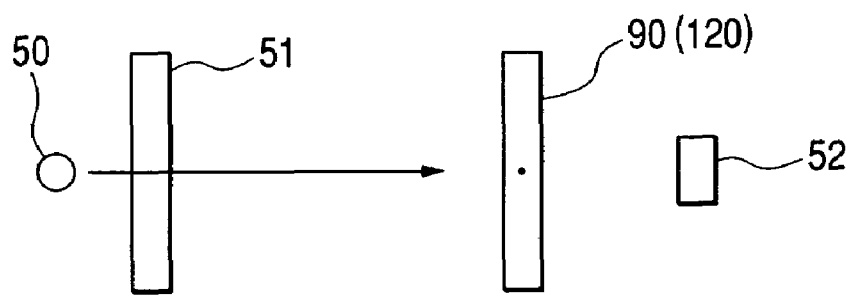
FIG. 3B shows a method of measuring the contrast ratio of a polarizing plate.

FIG. 3B shows a method of measuring the contrast ratio of a polarizing plate used for an auxiliary polarizer/analyzer. As shown in FIG. 3B, the measuring light source 50, measuring polarizing plate 51 and measuring light receiver 52 are the same as those used in the above method. The light source, measuring polarizing plate and object (polarizing plate) and measuring light receiver are located in the order of mention and brightness is measured with the same procedure as mentioned above. Similarly, reference measurement should also be made without the object in place. Here, the transmittance is calculated using the following formula:

Transmittance of the polarizing plate/PBS prism= (brightness by measurement with the object)/ (brightness by reference measurement)/2

For calculation of a contrast ratio, the transmittance should be measured in the following two modes as in the above method. One mode is that the absorption axis of the absorption polarizing plate (object) or the reflection axis of the reflection polarizing plate (object) is parallel to the absorption axis of the measuring polarizing plate (parallel mode) and the other is that the absorption axis of the absorption polarizing plate (object) or the reflection axis of the reflection polarizing plate (object) is perpendicular to the absorption axis (or reflection axis) of the measuring polarizer (perpendicular mode). The contrast ratio is calculated using the following formula:

Contrast ratio=(transmittance in the parallel mode)/(transmittance in the perpendicular mode)

Figure 3C:
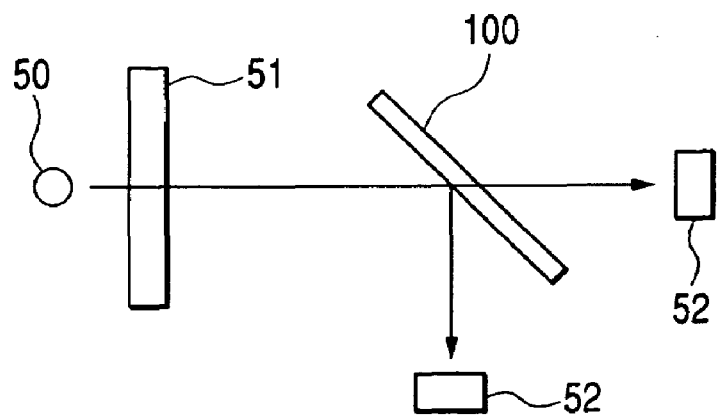
FIG. 3C shows a method of measuring the contrast ratio of a reflection polarizing plate.

FIG. 3C shows a method of measuring the contrast ratio when a reflection polarizing plate is used as a polarizer/analyzer. As shown in FIG. 3C, the measuring light source 50, measuring polarizing plate 51 and measuring light receiver 52 are the same as those used in the above method. The light source, measuring polarizing plate and object (reflection polarizing plate) and measuring light receiver are located in the order of mention and brightness is measured with the same procedure as mentioned above, except that the normal of the reflection polarizing plate (object) should be 45 degrees inclined with respect to the optical axis. Reference measurement should also be made without the object in place. When a reflection polarizing plate is used as an polarizer/analyzer, both the transmittance for light passing through the reflection polarizing plate and the reflectance for light reflected by it affect the contrast and brightness. The transmittance and reflectance are calculated using the following formulas:

Transmittance of the reflection polarizing plate= (transmitted light brightness by measurement with the object)/(brightness by reference measurement)

Reflectance of the reflection polarizing plate=(reflected light brightness by measurement with the object)/(brightness by reference measurement)

The reflection polarizing plate has both a transmission contrast ratio and a reflection contrast ratio. In order to calculate both, the transmittance and reflectance should be calculated in the two modes: the reflection axis of the reflection polarizing plate is parallel and perpendicular to the reflection (absorption) axis of the measuring polarizer (called the parallel mode and perpendicular mode, respectively). This means that it is necessary to take the measuring procedure four times. The transmission and reflection contrast ratios are calculated using the following formulas:

Transmission contrast ratio of the reflection polarizing plate=(transmittance in the parallel mode)/ (transmittance in the perpendicular mode)

Reflection contrast ratio of the reflection polarizing plate=(reflectance in the perpendicular mode)/ (reflectance in the parallel mode)

Figure 8:
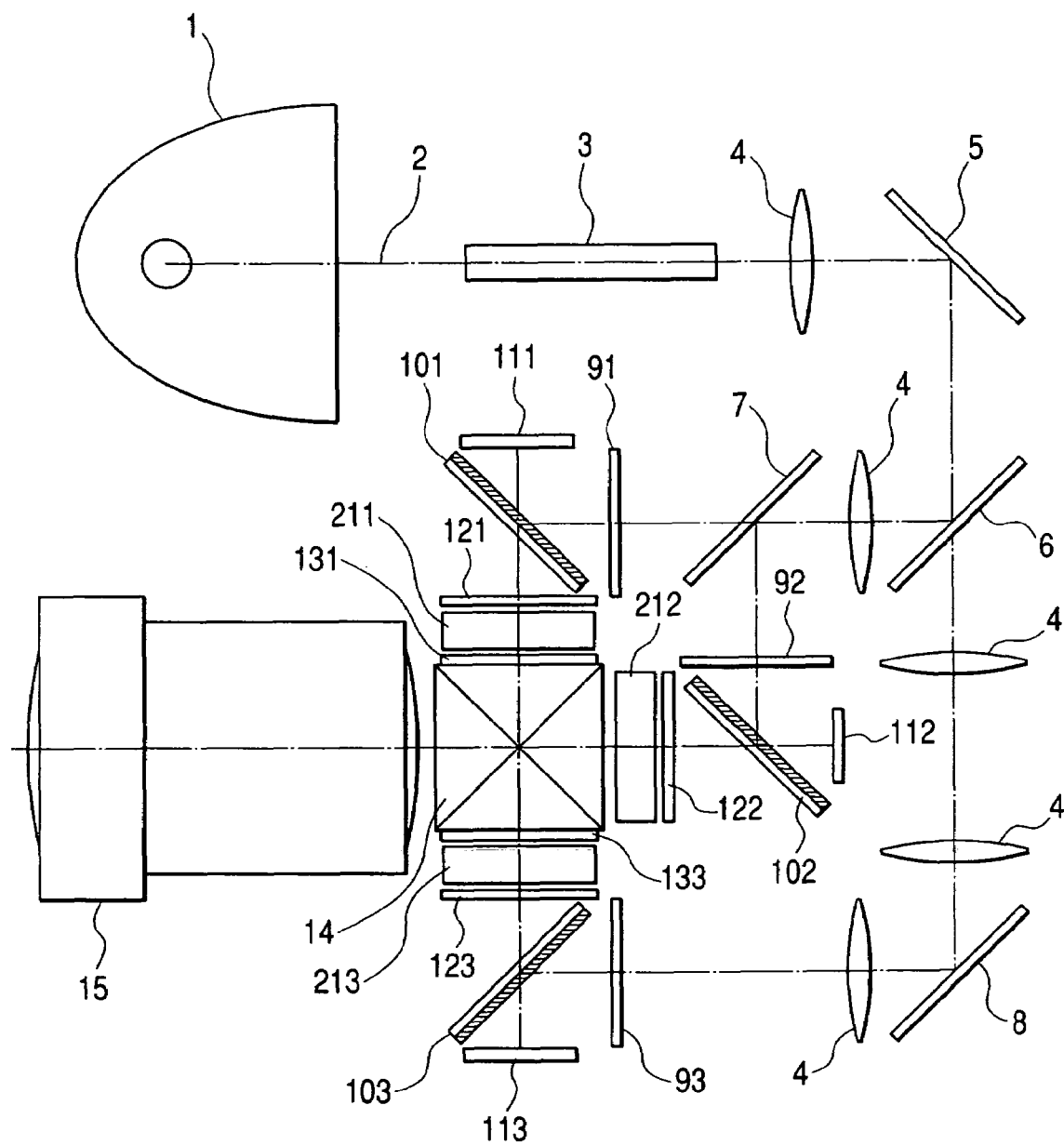
FIG. 8 shows the structure of a reflection type liquid crystal projector optical unit according to a fifth embodiment of the present invention.

Generally speaking, regarding the reflection polarizing plate, its transmission contrast ratio is higher than its reflection contrast ratio. Hence, in the structure where reflected rays from the reflection liquid crystal panels 111, 112, 113 are reflected by the reflection polarizing plates 101, 102, 103 before reaching the projection lens 15 as in this embodiment, if the contrast ratio of the auxiliary analyzers 121, 122, 123 is higher than the product of the contrast ratio of the polarization converter 25 in the rod lens 3 and the contrast ratio of the auxiliary polarizers 91, 92, 93, namely A*B<D, high efficiency and high contrast can be achieved. Or, in the structure where reflected rays from the reflection liquid crystal panels 111, 112, 113 pass through the reflection polarizing plates 101, 102, 103 before reaching the projection lens 15 as shown in FIG. 8, if the product of the contrast ratio of the polarization converter 25 in the rod lens 3 and the contrast ratio of the auxiliary polarizers 91, 92, 93 is higher than the contrast ratio of the auxiliary analyzers 121, 122, 123, namely A*B>D, high efficiency and high contrast can be achieved.

Figure 4:
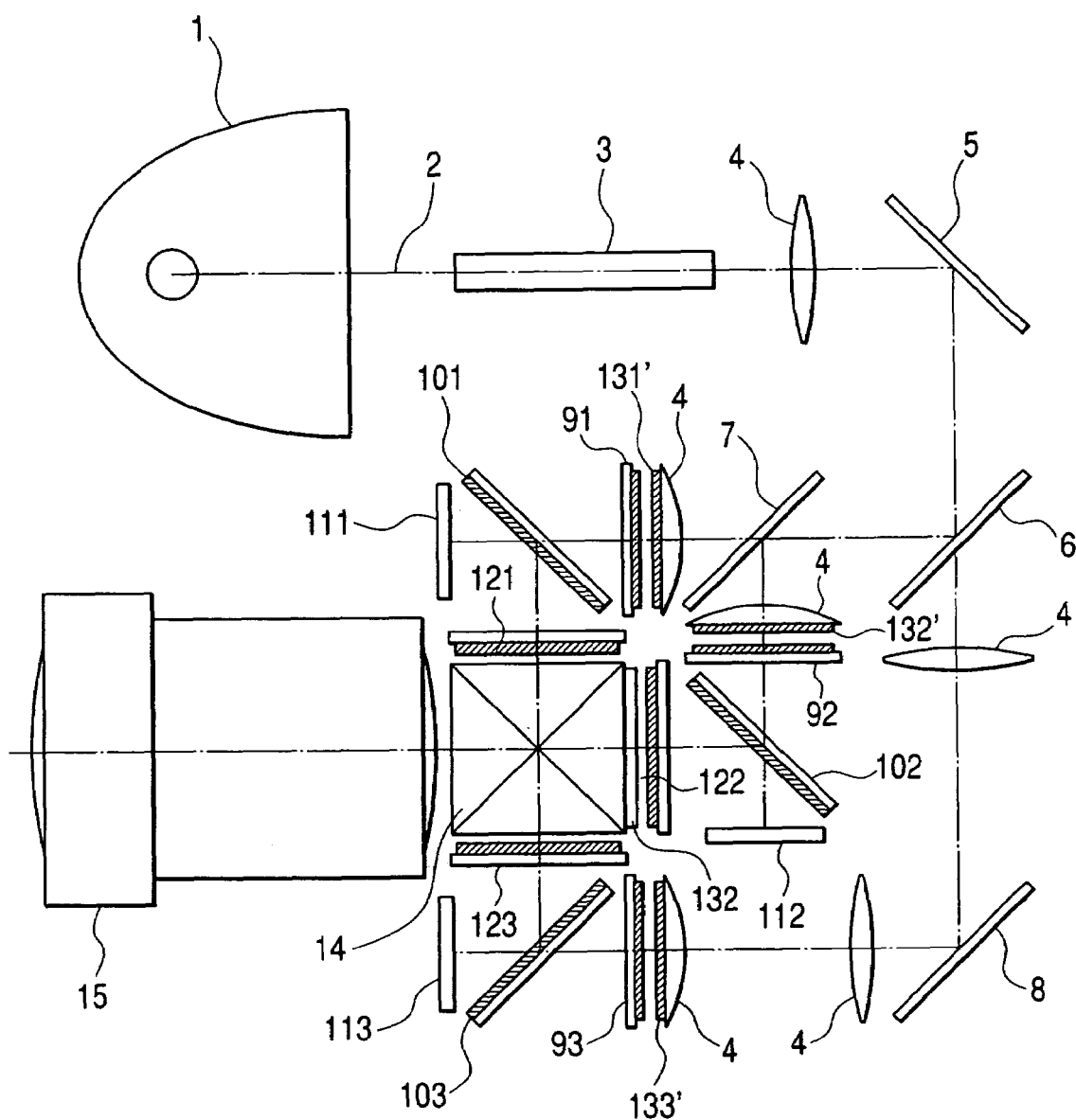
FIG. 4 shows the structure of a reflection type liquid crystal projector optical unit according to a third embodiment of the present invention.

FIG. 4 shows a reflection type liquid crystal projector optical unit according to another embodiment of the present invention. In the drawings of various embodiments described hereafter including FIG. 4, components with the same functions as those described already are designated by the same reference numerals and their descriptions will be omitted. In the following embodiments including the embodiment of FIG. 4, the same basic operations as those described already for the embodiment of FIG. 2 will not be described again and only different functional operations will be described.

As in the above embodiments, in the embodiment of FIG. 4, the auxiliary polarizers 91, 92, 93 and the auxiliary analyzers 121, 122, 123 are located or formed on transparent parallel plain plates. Transparent components such as focusing lenses 4 and a cross dichroic prism 14 are facing the auxiliary polarizers 91, 92, 93 and the auxiliary analyzers 121, 122, 123, with space between components. The space can be used as an air duct for cooling the auxiliary polarizers 91, 92, 93 and the auxiliary analyzers 121, 122, 123. Thanks to the air duct, they are cooled efficiently and the cooling fan may be run at a lower speed, so that the wind noise of the fins (not shown) of the cooling fan can be reduced, allowing quiet operation. Particularly when the auxiliary polarizers 91, 92, 93 and the auxiliary analyzers 121, 122, 123 are absorption type polarizing plates, the air duct is effective because most of the rays absorbed by the polarizing plates are converted into thermal energy. The distance of the air duct is desirably between 1 mm and 4 mm along the optical axis. If it is too short or too long, cooling air does not flow efficiently. If it is too long, the optical unit should be larger. Although this embodiment uses focusing lenses 4 and a cross dichroic prism 14 as transparent optical components, transparent parallel plain plates may be used instead if the design does not require that optical components be located there.

In the embodiment of FIG. 4, the focusing lenses 4, located to make an air duct for the auxiliary polarizers 91, 92, 93, have half-wave plates for color light paths 131', 132', 133' stuck on their surfaces. This enables polarized light to be rotated 90 degrees before or after the half-wave plates, which is convenient in the following situation. Since generally a mirror (reflection mirror, dichroic mirror, etc) is most efficient when it reflects polarized light, this embodiment is designed so that for the most efficient use of light, the polarization converter (not shown) in the rod lens 3 emits s-polarized light, a white reflection mirror 5 and B reflection mirror 8 reflect s-polarized light and the half-wave plates 131', 132', 133' located before the reflection polarizing plates 101, 102, 103 turn it into p-polarized light. In this arrangement, G light is reflected by all of the white reflection mirror 5, B-transmission RG-reflection dichroic mirror 6 and R-transmission G-reflection dichroic mirror 7. This arrangement is suitable for an optical unit which places priority on brightness performance because G light is most efficiently used. Especially, it is most suitable for a front projection image display apparatus optical unit in which brightness is important. When the half-wave plates 131', 132', 133' are placed after color separation optical components as in this embodiment, high efficiency can be achieved. Furthermore, as the air duct is facing the half-wave plates 131', 132', 133', the half-wave plates made of organic film which have to be cooled are efficiently cooled.

In this embodiment, the half-wave plate 132 is stuck to the incidence plane of the cross dichroic prism 14 in the G light path. Generally speaking, a dichroic mirror transmits p-polarized light more easily than s-polarized light. This is true of the cross dichroic prism 14. Since G light passing through the cross dichroic prism 14 is p-polarized light in the abovementioned arrangement, high efficiency is achieved. As in the situation mentioned above, efficient cooling is done because the half-wave plate 132 is facing the air duct.

Figure 5:
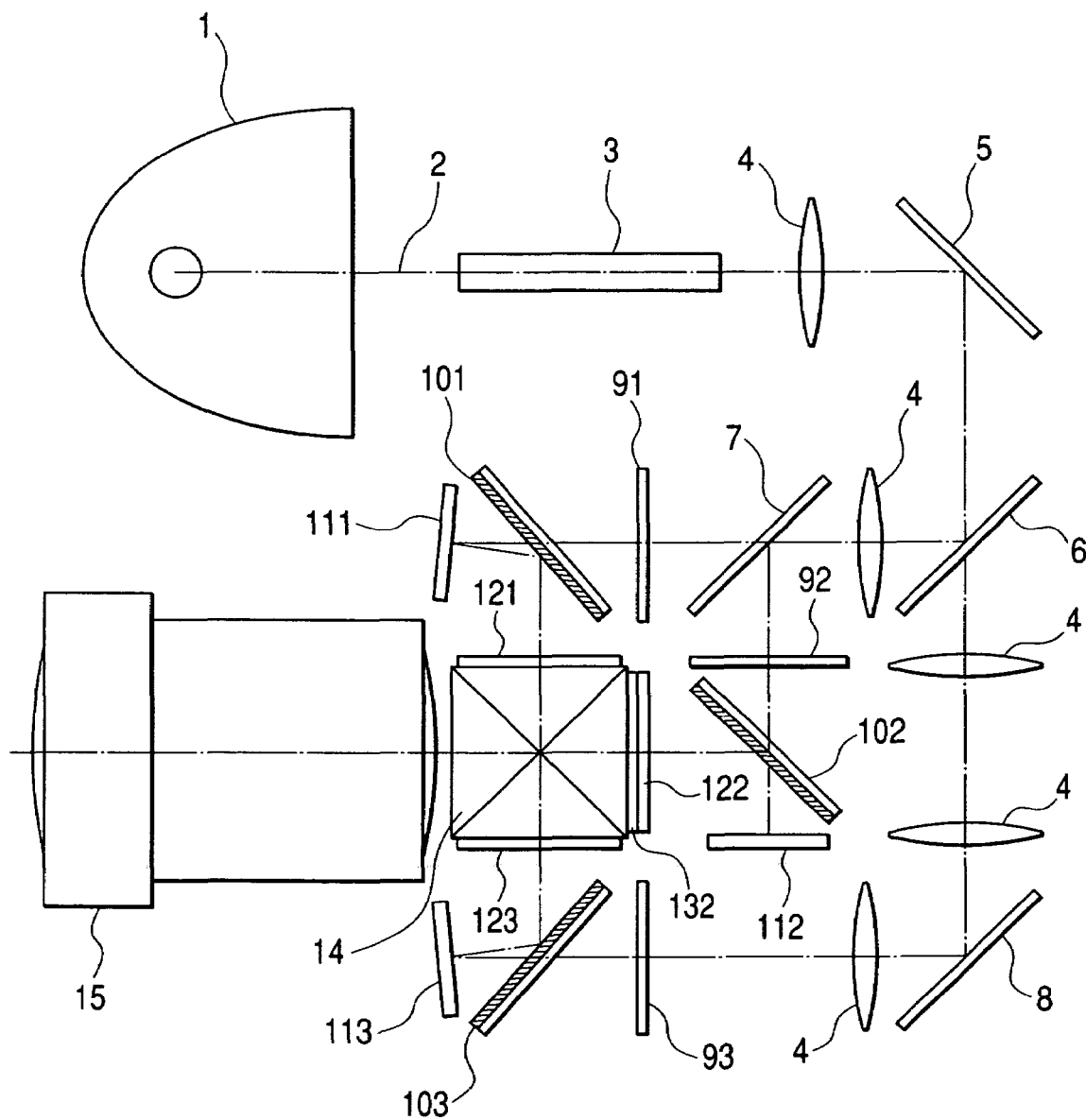
FIG. 5 shows the structure of a reflection type liquid crystal projector optical unit according to a fourth embodiment of the present invention.

FIG. 5 is a block diagram of a reflection type liquid crystal projector optical unit according to another embodiment of the present invention.

Figure 6:
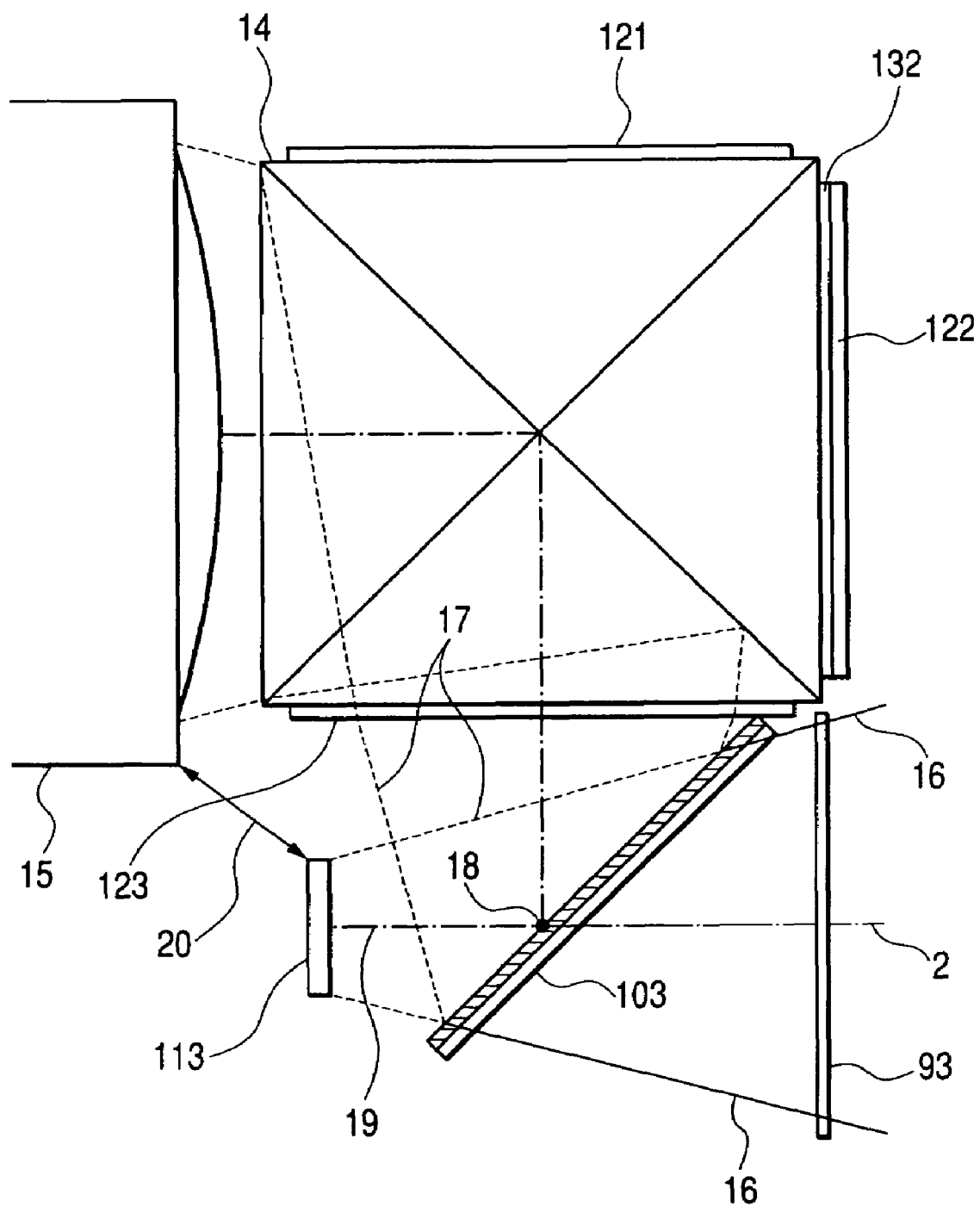
FIG. 6 shows the key part of FIG. 2 in enlarged form.
Figure 7:
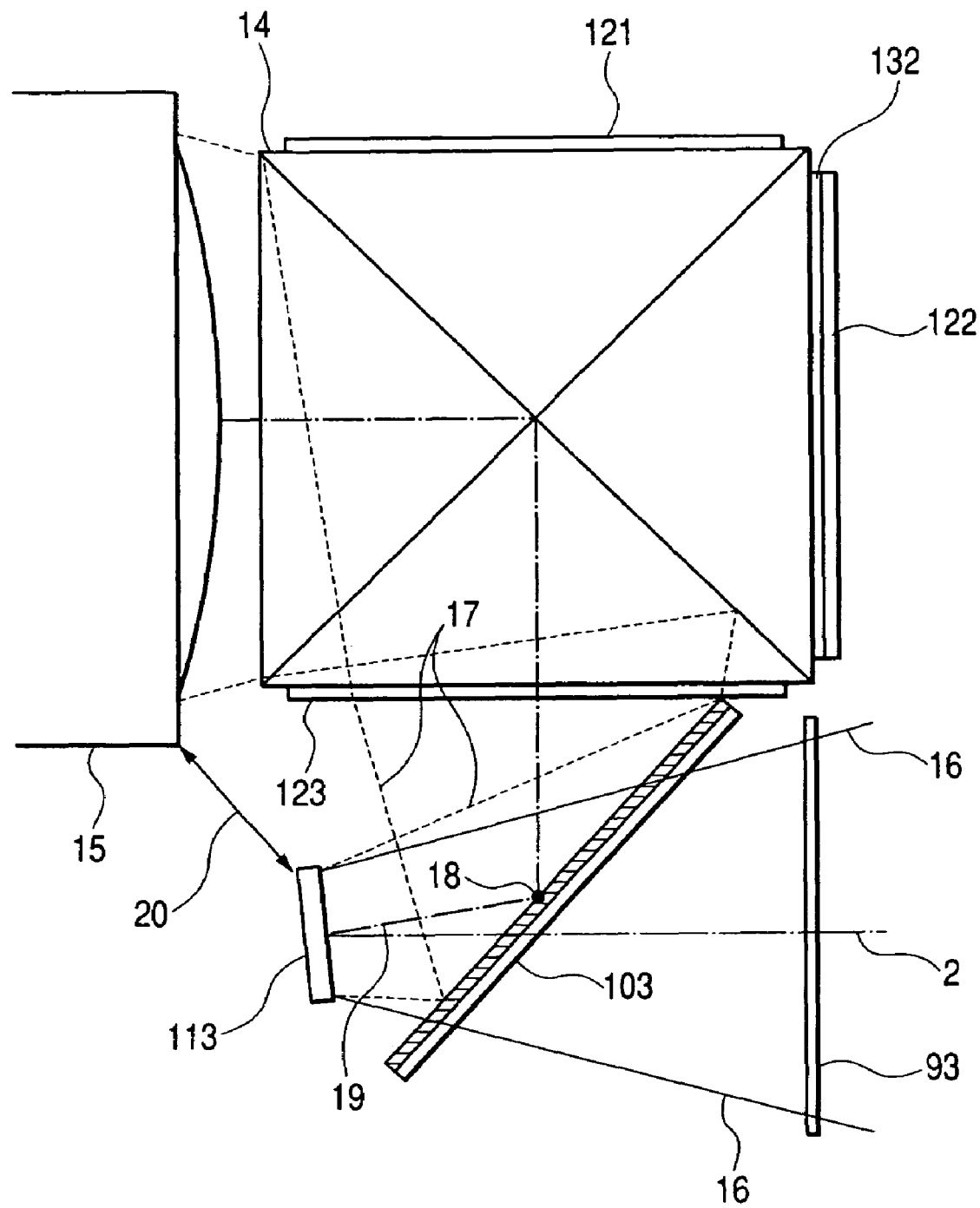
FIG. 7 shows the key part of FIG. 5 in enlarged form.
Figure 16:
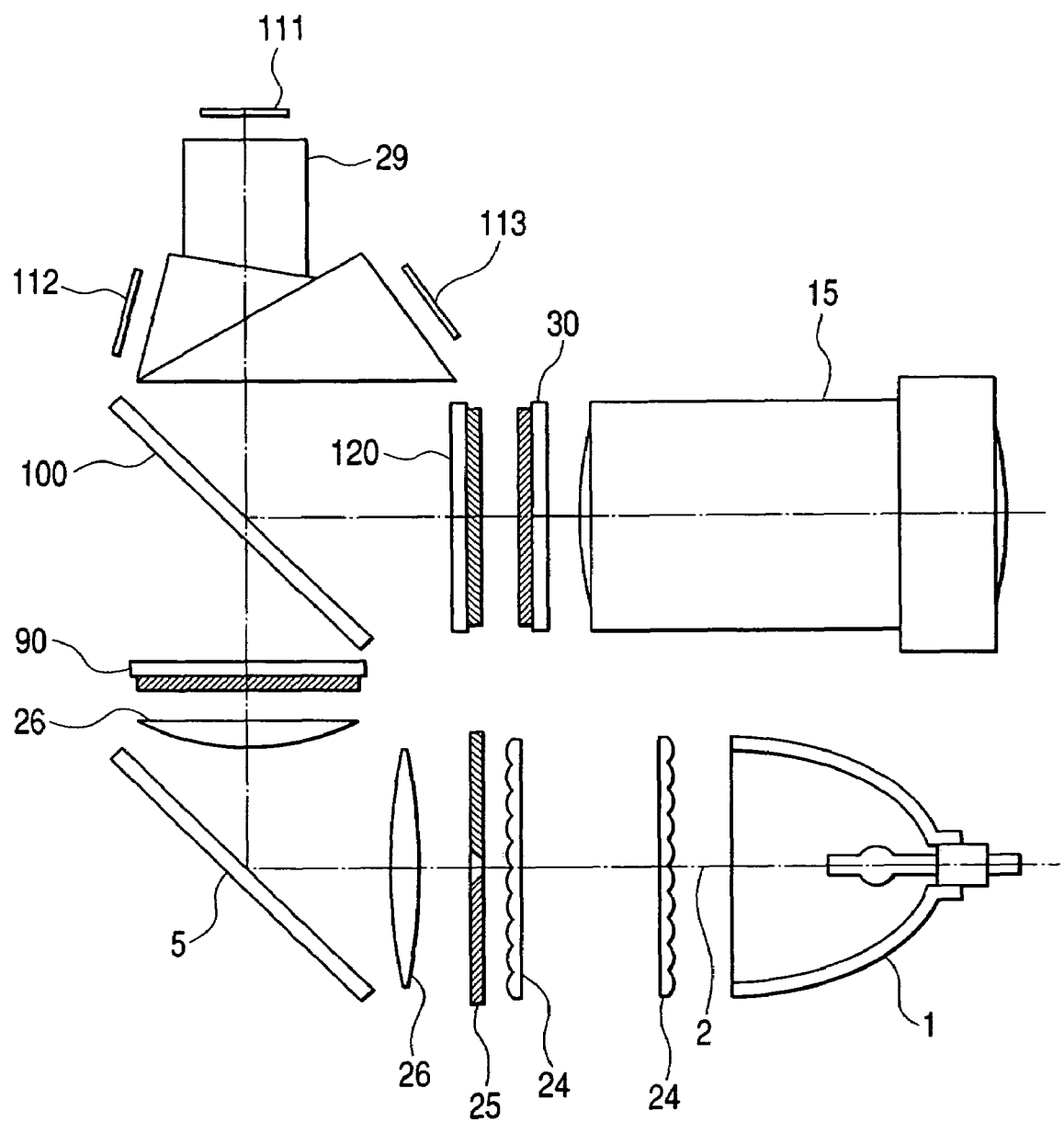
FIG. 16 shows the structure of a reflection type liquid crystal projector optical unit according to a thirteenth embodiment of the present invention.

As shown in FIG. 5, the reflection polarizing plate for R 101, the reflection polarizing plate for B 103, the reflection liquid crystal panel for R 111 and the reflection liquid crystal panel for B 113 are inclined. This arrangement prevents interference which might be caused by too small spacing between the projection lens 15 and the reflection liquid crystal panel for R 111 or the reflection liquid crystal panel for B 113 in the most compact design. Also the incidence angle of optical axis light rays impinging on components after the auxiliary analyzer for R 121 and the auxiliary analyzer for B 123 can be 0 degree. The reason for this is explained next referring to FIG. 6 and FIG. 7. FIG. 6 and FIG. 7 show, in enlarged form, the cross dichroic prism 14 and the reflection liquid crystal panel for B 113 and their vicinities which are shown in FIG. 2 and FIG. 5, respectively. Referring to FIG. 6 and FIG. 7, 16 represents an incoming beam to the reflection liquid crystal panel 113; 17 an outgoing beam reflected by the reflection liquid crystal panel 113; 18 the center of rotation of the reflection liquid crystal panel 113; 19 the back focus of the projection lens 15 (the distance from the projection lens 15, the nearest lens to the cross dichroic mirror 14, to the reflection liquid crystal panel) which coincides with the optical axis. Numeral 20 represents the shortest physical distance between the projection lens 15 and the reflection liquid crystal panel 113. As shown in FIG. 7, the reflection liquid crystal panel for B 113 is inclined as compared with the position of the same panel in FIG. 6 so that it is inclined approx. 5 degrees with respect to the center of rotation 18 while its distance from the center of rotation 18 is maintained. With the arrangement of FIG. 7, the shortest physical distance 20 between the projection lens 15 and the reflection liquid crystal panel for B 113 can be increased without an increase in the optical distance from the projection lens 15 to the reflection liquid crystal panel for B 113, namely the back focus 19. Hence, with the arrangement of FIG. 7, when the size of the optical system is to be minimized, the shortest physical distance 20 between the projection lens 15 and the reflection liquid crystal panel for B 113 can be increased while interference by the structural components holding these components is prevented.

As shown in FIG. 7, the reflection polarizing plate for B 103 is inclined 5 degrees in the same direction as the reflection liquid crystal panel for B 113. When the reflection polarizing plate and the reflection liquid crystal panel in the same light path are inclined by the same angle in the same direction in this way, the incidence angle of the optical axis rays impinging on the components after the reflection polarizing plate for B 103 can be 0 degree. Specifically, regarding the light passing through the auxiliary polarizer 93, while the incidence angle of the optical axis rays impinging on the reflection polarizing plate for B 103 is 45 degrees in the case of FIG. 6, it is 40 degrees in the case of FIG. 7; and while their incidence angle on the reflection liquid crystal panel for B 113 is 0 degree in the case of FIG. 6, it is 5 degrees in the case of FIG. 7. Regarding the rays reflected by the reflection liquid crystal panel for B 113 which are going to reenter the reflection polarizing plate 103, while the incidence angle on the reflection polarizing plate 103 is 45 degrees in the case of FIG. 6, it is 50 degrees in the case of FIG. 7. Regarding the rays reflected and bent by the reflection polarizing plate for B 103 which are going to enter the auxiliary analyzer for B 123, the incidence angle on the analyzer 123 is 0 degree in both cases of FIG. 6 and FIG. 7. Generally speaking, the cross dichroic prism 14 and the projection lens 15 demonstrate the best color combining and focusing performance when optical axis rays are perpendicularly cast on them. Thus, the optical performance for the arrangement of FIG. 7 is equal to that for the arrangement of FIG. 6. In the arrangement of FIG. 7, it is desirable that the inclination angle for the reflection polarizing plate 103 and the reflection liquid crystal panel 113 be between 3 degrees and 5 degrees with respect to the center of rotation 18. If this angle is too small, it is less effective; if the angle is too large, the reflection polarizing plate and the reflection liquid crystal panel cannot demonstrate their performance sufficiently. Apparently, the same is also true of the R light path, though the above explanation of the arrangement of FIG. 7 concerns the B light path.

FIG. 8 shows a reflection type liquid crystal projector optical unit according to another embodiment of the present invention.

Unlike those shown in FIG. 2, the reflection liquid crystal panels 111, 112, 113 shown in FIG. 8 are parallel to the three incidence planes of the cross dichroic prism 14 respectively. This embodiment is designed so that light from the light source 1 is reflected by the reflection polarizing plates 101, 102, 103 and cast on the reflection liquid crystal panels 111, 112, 113. Hence, the working planes (hatched) of the reflection polarizing plates 101, 102, 103 are on the side of the incidence planes of the auxiliary polarizers 91, 92, 93.

In FIG. 8, 211, 212, and 213 represent R, G, and B astigmatism correctors respectively. They may be cylindrical lenses or transparent parallel plain plates (parallel plain plates should be parallel to the main incidence planes of the reflection polarizing plates and inclined (rotated) with respect to the axis perpendicular to the optical axis as the axis of rotation.)

Next, how this structure works is described. In this embodiment, the sequence is the same as in the embodiment of FIG. 2 until R, G and B rays pass through the auxiliary polarizer for R 91, the auxiliary polarizer for G 92 and the auxiliary polarizer for B 93, except that the rod lens 3 with a polarization conversion function emits s-polarized light which then remains s-polarized. Incoming s-polarized rays are reflected and bent 90 degrees by the reflection polarizing plate for R 101, the reflection polarizing plate for G 102 and the reflection polarizing plate for B 103 before reaching the reflection liquid crystal panel for R 111, the reflection liquid crystal panel for G 112, and the reflection liquid crystal panel for B 113, respectively. The rays, which are reflected by the reflection liquid crystal panel for R 111, the reflection liquid crystal panel for G 112, and the reflection liquid crystal panel for B 113, become p-polarized. They respectively pass through the reflection polarizing plate for R 101, the reflection polarizing plate for G 102, and the reflection polarizing plate for B 103 as well as the auxiliary analyzer for R 121, the auxiliary analyzer for G 122, and the auxiliary analyzer for B 123. In this structure, as they pass through the reflection polarizing plates 101, 102, 103, they pass through the base parallel plain plates. Thus astigmatism might occur, resulting in deterioration in the resolution of a projected image. In order to prevent such resolution deterioration by correction of astigmatism, an astigmatism corrector for R 211, an astigmatism corrector for G 212 and an astigmatism corrector for B 213 are located after the auxiliary analyzers 121, 122, 123. After passing through these astigmatism correctors, RB light is turned into s-polarized light by the half-wave plate for R 131 and the half-wave plate for B 133. The G light, which remains p-polarized, is cast on the cross dichroic prism 14 and projected on the screen (not shown) by the projection lens 15.

In this embodiment, the astigmatism correctors are placed between the auxiliary analyzers 121, 122, 123 and the cross dichoric prism 14. However they may be placed differently. They may be placed anywhere as far as they are between the reflection polarizing plates 101, 102, 103 and the cross dichroic prism 14.

With this structure, the reflection liquid crystal panels 111, 112, 113 are located away from the projection lens 15. Therefore it is possible to prevent interference between the projection lens 15 and the structural components holding the components of the reflection liquid crystal panel for R 111 and the reflection liquid crystal panel for B 113. However, because of the use of the astigmatism correctors 211, 212, 213, the optical unit should be larger.

Figure 9:
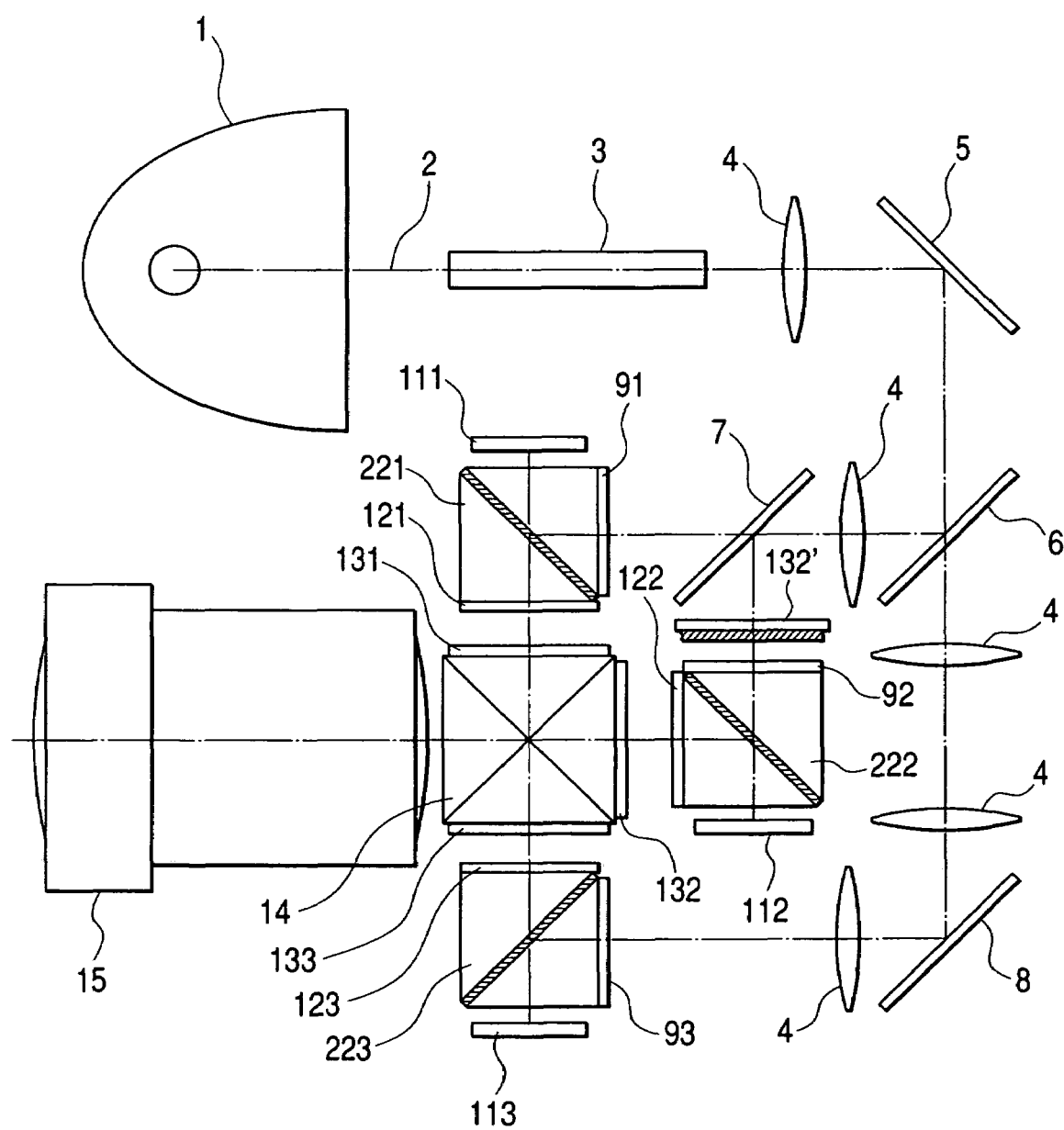
FIG. 9 shows the structure of a reflection type liquid crystal projector optical unit according to a sixth embodiment of the present invention.

FIG. 9 shows a reflection type liquid crystal projector optical unit according to another embodiment of the present invention.

In FIG. 9, 221, 222, and 223 represent a reflection polarizing prism for R, a reflection polarizing prism for G, and a reflection polarizing prism for B, respectively. They incorporate reflection polarizing planes (hatched). Numeral 132' represents a half-wave plate.

Here, for R light and B light, the optical structure and sequence up to the auxiliary analyzers 121, 123 are the same as in the structure shown in FIG. 8 except that the reflection polarizing prisms are used in place of the reflection polarizing plates. For G light, the optical structure and sequence are the same as in the structure shown in FIG. 8 except that the reflection polarizing prism for G is used in place of the reflection polarizing plate for G; a half-wave plate for G 132' which changes G light from s-polarized light into p-polarized light is located before the reflection polarizing prism for G 222, and the half wave plate for G 132 is located before the cross dichroic prism 14. Therefore, only the functions which are different from the abovementioned are described below.

As R light and B light pass through the half-wave plate for R 131 and the half-wave plate for B 133 after passing through the auxiliary analyzers 121 and 123 respectively, they become s-polarized and enter the cross dichroic prism 14. G light passes through the half-wave plate for G 132' before passing through the reflection polarizing prism for G 222 as p-polarized light; it then reaches the reflection liquid crystal panel for G 112. The light reflected by the reflection liquid crystal panel for G 112 becomes s-polarized and passes through the auxiliary analyzer for G 122 before entering through the half-wave plate for G 132 into the cross dichroic prism 14 as p-polarized light. Regarding G light, the light reflected by the reflection liquid crystal panel 112 may pass through the reflection polarizing prism for G, like R light and B light; however, if it is impossible to place the reflection liquid crystal panel for G 112 because of interference between a relay light path component and the component holding the panel 112, the optical structure for G light may be such that the light reflected by the reflection liquid crystal panel for G 112 is reflected by the working plane in the reflection polarizing prism for G, as shown here.

In the reflection polarizing prisms 221, 222, 223, incoming and outgoing rays pass through vertical planes only, which means that no astigmatism occurs and the astigmatism correctors (FIG. 8) are no longer needed. In addition, since the reflection liquid crystal panel for R 111 and the reflection liquid crystal panel for B 113 are located away from the projection lens 15, it is possible to prevent interference between the projection lens 15 and the structural components holding the components of the reflection liquid crystal panel for R 111 and the reflection liquid crystal panel for B 113.

Figure 10:
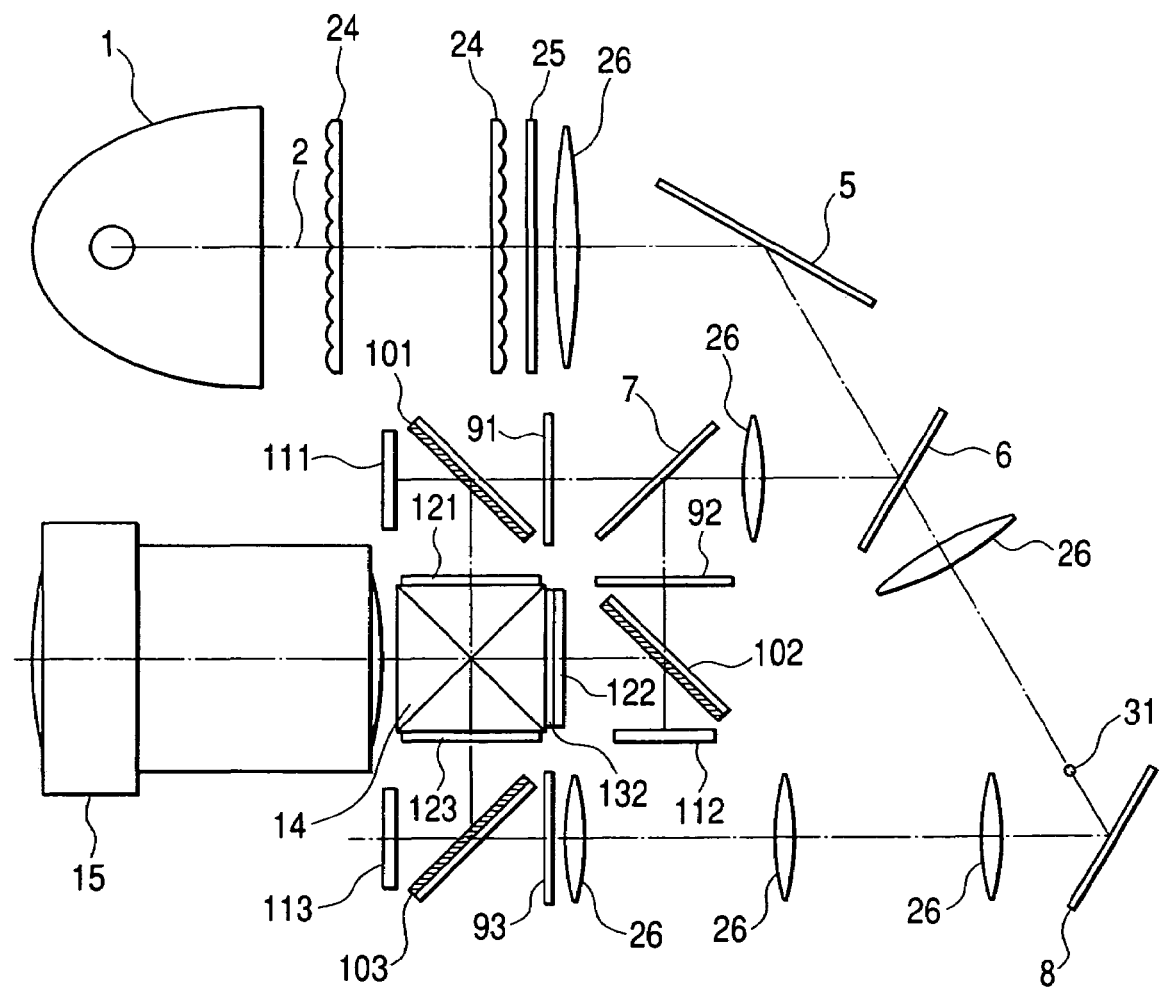
FIG. 10 shows the structure of a reflection type liquid crystal projector optical unit according to a seventh embodiment of the present invention.

FIG. 10 shows a reflection type liquid crystal projector optical unit according to another embodiment of the present invention. In FIG. 10, 24 represents an integrator consisting of two multi-lenses (each multi-lens consists of a matrix of lens cells); 25 a polarization converter consisting of a PBS array and a half-wave plate; 26 a lens which projects the shape (rectangle similar to the reflection liquid crystal panels) of each of the lens cells (not shown) of the light source side multi-lens of the integrator 24 on the reflection liquid crystal panels 111, 112, 113.

Next, referring to FIG. 10, an explanation is given below of how a reflection type liquid crystal projector optical unit according to the present invention works for white image display. In FIG. 10, rays coming from the light source 1 are transmitted through the two multi-lenses 24, then through polarization converter 25 and bent approx. 60 degrees by the white reflection mirror 5 before reaching the B-transmission RG-reflection dichroic mirror 6 where RG rays are reflected and bent approx. 60 degrees and B rays are transmitted. The reflected RG rays reach the R-transmission G-reflection dichroic mirror 7 where G rays are reflected and bent 90 degrees and R rays are transmitted. The B rays are bent approx. 120 degrees by the B-reflection mirror 8. Then, the R, G, and B rays enter the auxiliary polarizer for R 91, the auxiliary polarizer for G 92, and the auxiliary polarizer for B 93, respectively. The remaining sequence is the same as that of the embodiment of FIG. 2 and its explanation is omitted.

Next, this embodiment is explained in detail. Regarding the light path for B light which passes through the B-transmission RG-reflection dichroic mirror 6, located near the light source, the optical distance from the B-transmission RG-reflection dichroic mirror 6 to the reflection liquid crystal panel 113 is longer than that for the R and G light paths. So it is called the "relay light path." In the R and G light paths, the rectangular image of the integrator lens cells which is formed by the integrator 24 and the lens 26 is directly focused on the reflection image display devices 111 and 112. On the other hand, in the relay light path, since the optical distance is longer, the rectangular image of the lens cells of the integrator 24 is once focused (position 31) in the light path and the image is refocused on the reflection liquid crystal panel 113. For this reason, at least one lens 26 for refocusing the image is needed in the relay light path. Because the rectangular image focused on the reflection liquid crystal panel 113 is a refocused image, it tends to be poorer in quality with blurs in the image marginal area than the image focused on the reflection liquid crystal panels 111 and 112 in the R and G light paths. The quantity of light per unit area is smaller in a blurred image part than in a non-blurred image part; therefore, if there is some rectangular image blur within the effective area of the reflection liquid crystal panel 113, the marginal illuminance ratio (ratio of image marginal area illuminance to image center illuminance) for white image display will decrease. If there is no rectangular image blur within the effective area of the reflection liquid crystal panels 111 and 112 in the R and G light paths but there is a rectangular image blur within the effective area of the reflection liquid crystal panel 113 in the relay light path, the color illuminance balance in the center is different from that in the marginal area and as a consequence the color of the center of the displayed white image is different from the color of the marginal area. To prevent this, the magnification of the rectangular image in the relay light path should be higher than that in the R and G light paths so that a larger rectangular image is focused on the reflection liquid crystal panel 113 and the rectangular image's inner or non-blurred area falls in the effective area of the reflection liquid crystal panel 113. However, in this case, because the light in the marginal blurred area is not used and the light utilization efficiency is lowered. To avoid this, two or more refocusing lenses 26 should be used to improve the quality of the refocused image. It is desirable to use as many aspheric lenses for the refocusing lenses 26 as possible though aspheric lenses are expensive and the cost-performance tradeoff should be taken into consideration.

In order to minimize the incidence angle range of light impinging on the reflection liquid crystal panel and reduce blurring of the rectangular image of the integrator on the reflection liquid crystal panel, it is necessary to consider not only the number of lenses 26 and the type of lens but also the optical distance. It is effective to maximize the optical distance from the rectangular image of the integrator in the relay light path (position 31) to the lens 26 nearest to the reflection liquid crystal panel 113; desirably it should be more than twice the optical distance from the lens 26 nearest to the reflection liquid crystal panel 113 to the panel 113. To realize this, in the structure shown in FIG. 10, the B-transmission RG-reflection dichroic mirror 6 in the relay light path and the lens 26 nearest to the light source 1 in the relay light path are as near to the light source 1 as possible and the curvature radius of the lens 26 is decreased to the extent that the focusing performance does not deteriorate, so that the rectangular image of the integrator in the relay light path is focused as near to the light source 1 as possible.

Also, as shown in FIG. 10, out of the two dichroic mirrors 6 and 7, the B-transmission RG-reflection dichroic mirror 6, which is nearer to the light source, is inclined so that the incidence angle of the optical axis rays is approx. 30 degrees. In the light path for B light passing through the B-transmission RG-reflection dichroic mirror 6, the B reflection mirror 8, located behind it, is inclined so that the incidence angle of the optical axis rays is approx. 30 degrees. Thus, when the incidence angle of the optical axis rays is not more than 45 degrees, only the optical distance of the relay light path can be increased. If the angle of the mirrors is too small in comparison with the incidence angle of the optical axis rays (45 degrees), they are less effective; if it is too large, the lens cannot be located near the above dichroic mirror. Hence, desirably their angle should be between 20 degrees and 40 degrees.

As mentioned above, the optical distance from the rectangular image of the integrator in the relay light path (position 31) to the lens 26 nearest to the reflection liquid crystal panel 113 in the light path is increased and the focusing performance is improved and a bright image without color unevenness is obtained, resulting in improved light utilization efficiency.

Figure 11:
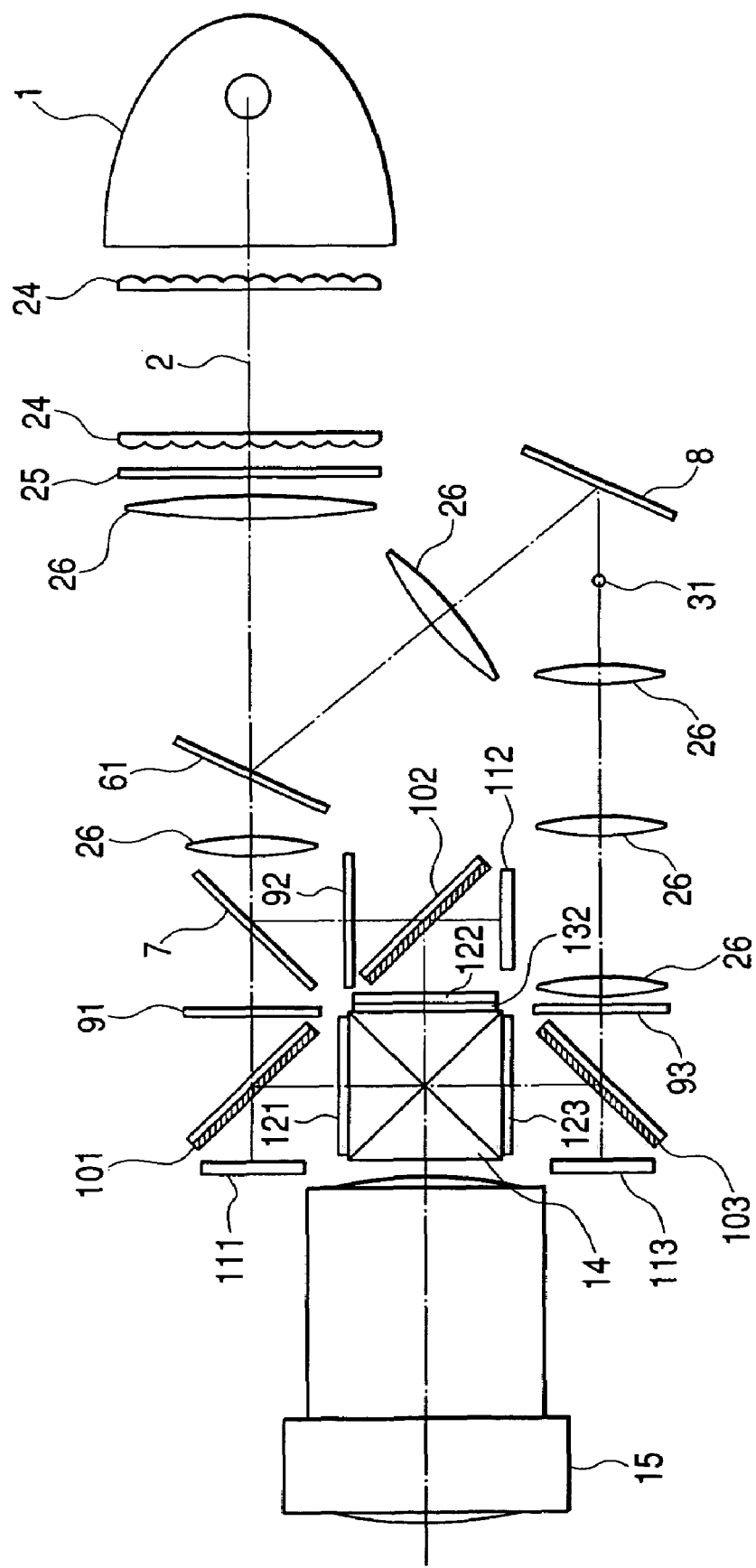
FIG. 11 shows the structure of a reflection type liquid crystal projector optical unit according to an eighth embodiment of the present invention.

FIG. 11 shows a reflection type liquid crystal projector optical unit according to another embodiment of the present invention. In FIG. 11, 61 represents a RG-transmission B-reflection dichroic mirror.

Next, referring to FIG. 11, an explanation is given below of how a reflection type liquid crystal projector optical unit according to the present invention works for white image display. In FIG. 11, rays coming from the light source 1 are transmitted through the two multi-lenses 24, then through the polarization converter 25; B rays are reflected and bent approx. 50 degrees by the RG-transmission B-reflection dichroic mirror 61 and RG rays are transmitted. The G rays are reflected and bent approx. 90 degrees by the R-transmission G-reflection dichroic mirror 7 and the R rays are transmitted. The B rays are bent approx. 50 degrees by the B-reflection mirror 8. Then the R, G, and B rays enter the auxiliary polarizer for R 91, the auxiliary polarizer for G 92, and the auxiliary polarizer for B 93, respectively. The remaining sequence is the same as that of the embodiment of FIG. 2 and its explanation is omitted.

Like the embodiment of FIG. 10, in this structure, the optical distance from the rectangular image of the integrator in the relay light path (position 31) to the lens 26 nearest to the reflection liquid crystal panel 113 is more than twice the optical distance from the lens 26 nearest to the reflection liquid crystal panel 113 to the panel 113. Consequently, the focusing performance is improved and an image with uniform brightness and no color unevenness is obtained, resulting in improved light utilization efficiency.

Figure 12:
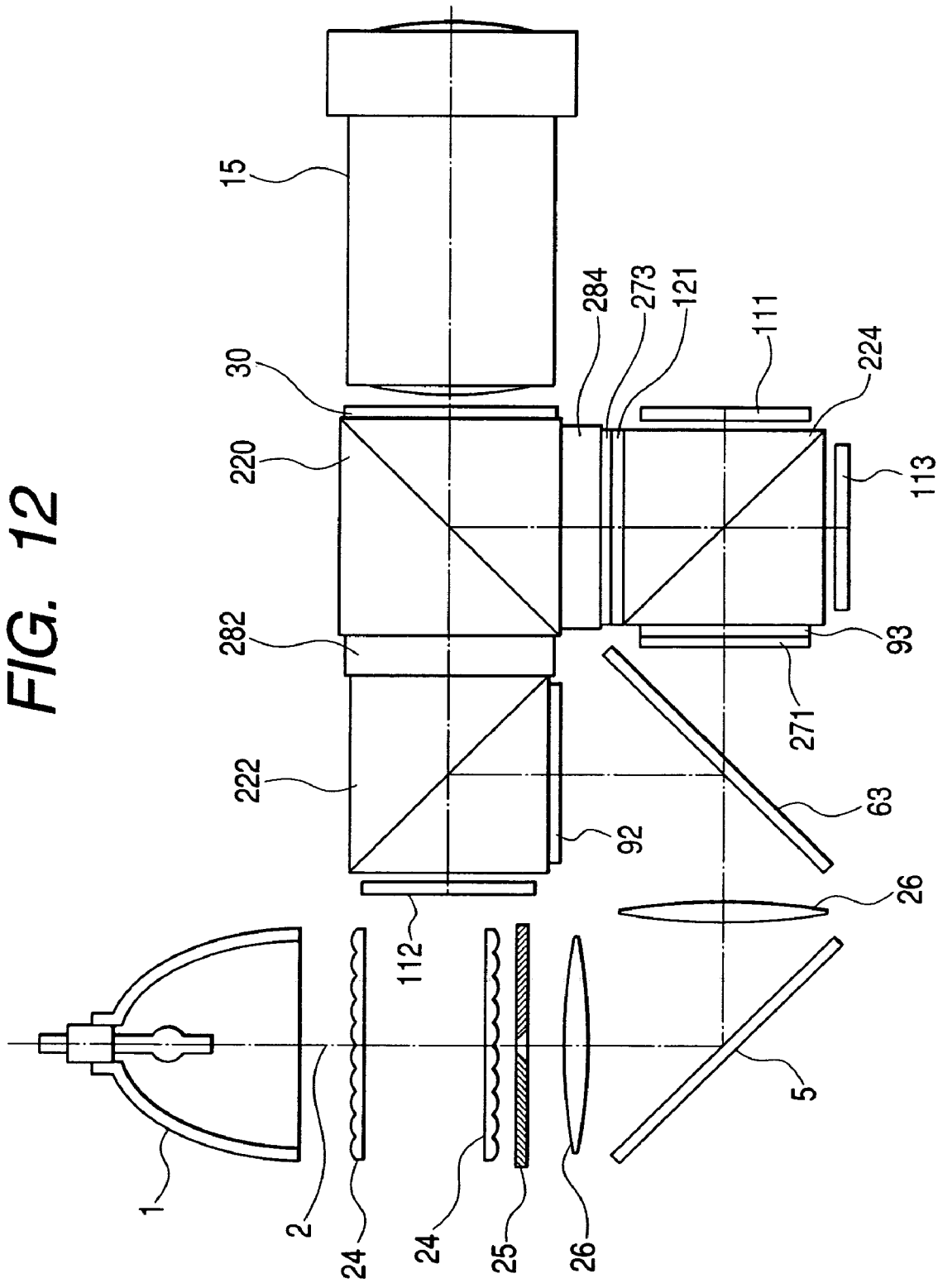
FIG. 12 shows the structure of a reflection type liquid crystal projector optical unit according to a ninth embodiment of the present invention.

FIG. 12 shows a reflection type liquid crystal projector optical unit according to another embodiment of the present invention.

In FIG. 12, 63 represents an RB-transmission G-reflection dichroic mirror; 92 an auxiliary polarizer for G; 93 an auxiliary polarizer for B; 271 a color selective wave plate for R; 222 a reflection polarizing prism for G; and 224 a reflection polarizing prism for RB. Numerals 111, 112, and 113 respectively represent a reflection liquid crystal panel for R, a reflection liquid crystal panel for G, and a reflection liquid crystal panel for B. Numeral 121 represents an auxiliary analyzer for R; 273 a color selective wave plate for B; 282 and 284 spacer prisms; 220 a light-combining reflection polarizing prism; 30 a quarter-wave plate for white; and 15 a projection lens.

Next, referring to FIG. 12, an explanation is given below of how a reflection type liquid crystal projector optical unit according to the present invention works for white image display. In FIG. 12, rays coming from the light source 1 are transmitted through the integrator 24, then through the polarization converter 25 and s-polarized. They are bent 90 degrees by the white reflection mirror 5 before reaching the RB-transmission G-reflection dichroic mirror 63 where G rays are reflected and RB rays are transmitted. The G rays are transmitted through the auxiliary polarizer for G 92 and reflected and bent 90 degrees in the reflection polarizing prism for G 222 (because they are s-polarized) before reaching the reflection liquid crystal panel 112. The rays reflected by the reflection liquid crystal panel for G pass through the reflection polarizing prism for G 222 and spacer prism 282 (because they are p-polarized) before reaching the light-combining reflection polarizing prism 220. The RB rays pass through the color selective wave plate for R 271 and then through the auxiliary polarizer for B 93. As they pass through the wave plate 271, only R rays are rotated 90 degrees and p-polarized rays; therefore, the R rays pass through the reflection polarizing prism for RB 224 while the B rays are reflected by the prism 224 and bent 90 degrees (RB light is thus separated into R light and B light). Then the R rays and B rays reach the reflection liquid crystal panel for R 111 and the reflection liquid crystal panel for B 113, respectively. The R rays reflected by the panel 111 are s-polarized while the B rays reflected by the panel 113 are p-polarized so the R rays are reflected in the prism 224, the B rays are transmitted through the prism 224 and both are combined. The RB rays pass through the auxiliary analyzer for R 121, the color selective wave plate for B 273 and the spacer prism 284 before reaching the light-combining reflection polarizing prism 220. As they pass through the color selective wave plate for B 273, only B rays are rotated 90 degrees and s-polarized; thus the RB rays are reflected in the light-combining reflection polarizing prism 220 and bent 90 degrees. The G rays and RB rays are combined into a white image, which is projected on the screen (not shown) in enlarged form by the projection lens 15.

In this embodiment, there is no analyzer for G on the exit side of the reflection polarizing prism for G 222 in the G light path. The reason is that the light-combining reflection polarizing prism 220 also serves as an analyzer for G light. For the same reason, there is no analyzer for B on the exit side of the reflection polarizing prism for RB 224 in the B light path. On the other hand, the R light reflected by the reflection liquid crystal panel for R 111 is reflected by the working planes of the reflection polarizing prism for RB 224 and the light-combining reflection polarizing prism 220. So if the two reflection polarizing prisms are used as analyzers, the amount of leak light is larger than in the case of G light and B light which once pass through a working plane. To remove (absorb) this light leakage, an auxiliary analyzer for R is provided on the exit side of the reflection polarizing prism for RB 224. Regarding the RB light separated by the RB-transmission G-reflection dichroic mirror 63, the R light passes through the reflection polarizing prism for RB 224 and thus contains little polarized component leading to light leakage. For this reason, there is no auxiliary polarizer for R. However, regarding RB light, the B light is reflected by the reflection polarizing prism for RB 224, so that there is an auxiliary polarizer for B 93.

In the above case, multi-lenses are used for the integrator. However, obviously another type of integrator, such as a light pipe or rod lens, may be used.

Although this embodiment uses the reflection polarizing plane in the reflection polarizing prism 220 as a light-combining plane to make up white, a dichroic mirror surface may also be used for the same purpose. If that is the case, the color-selective wave plate for B is no longer needed and the cost can be reduced; but it may become necessary to increase the number of auxiliary analyzers.

Regarding the two reflection polarizing prisms 222 and 224 which function as polarizers/analyzers, one may be a prism and the other may be a plain plate. If that is the case, the optical distance from the reflection liquid crystal panel to the projection lens must be almost identical for R, G and B light in order to assure satisfactory focusing performance of the projection lens. Hence, in the light path including the reflection polarizing prism, the optical distance from the reflection polarizing prism to the light combining prism must be increased.

Like the abovementioned embodiments, this embodiment provides an optical unit which provides high contrast and excellent image focusing performance. This structure uses one reflection polarizing prism as a polarizer/analyzer for two reflection liquid crystal panels while sharing a light path, which eliminates the need for a relay light path and thus makes it possible to realize a compact optical unit.

Figure 13:
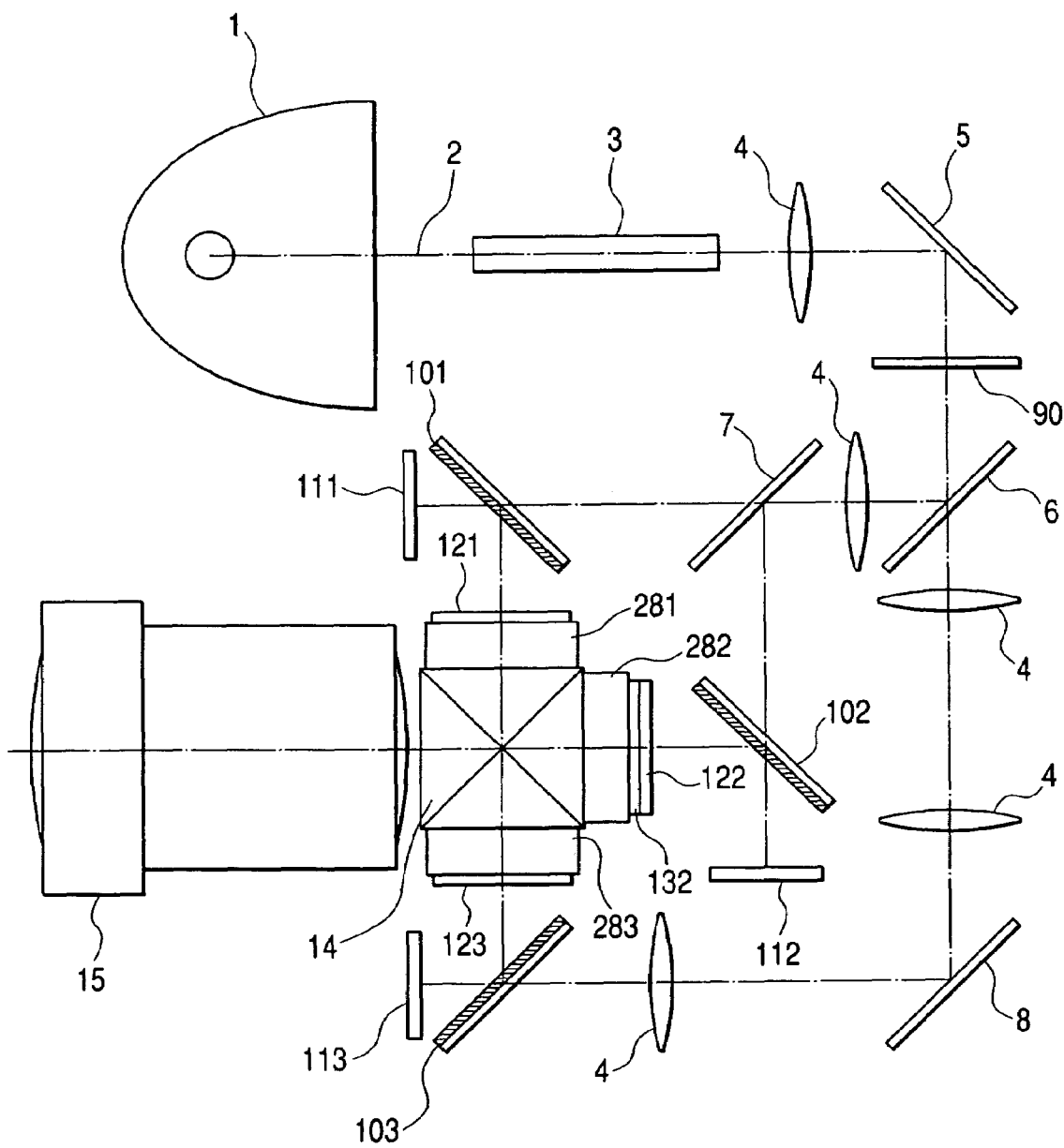
FIG. 13 shows the structure of a reflection type liquid crystal projector optical unit according to a tenth embodiment of the present invention.

FIG. 13 shows a projector optical unit according to another embodiment of the present invention.

In FIG. 13, 90 represents an auxiliary polarizer for white; 281, 282, and 283 a spacer prism for R, a spacer prism for G, and a spacer prism for B, respectively.

This embodiment replaces the three auxiliary polarizers 91, 92, 93 used in the embodiment of FIG. 2 by an auxiliary polarizer for white 90 and has the spacer prisms 281, 282, 283 between the cross dichroic prism 14 and each of the auxiliary analyzers 121, 122, 123.

With the spacer prisms 281, 282, 283 between the reflection polarizing plates 111, 112, 113 and the projection lens 15, the shortest physical distance between the reflection liquid crystal panel for R 111 and the reflection liquid crystal panel for B 113 can be increased in order to prevent interference between the projection lens 15 and the structural components holding the reflection liquid crystal panel for R 111 and the reflection liquid crystal panel for B 113. In this case, the back focus is longer than in the embodiment of FIG. 2. However, the necessity for a larger projection lens 15 due to a longer back focus is minimized by the use of the spacer prisms 281, 282, 283 for the following reason. Because of the spacer prism refractive index, the optical distance is shorter in the structure with the spacer prisms 281, 282, 283 than in a structure where optical components other than the spacer prisms are used in the same positions and there are air gaps in place of the spacer prisms. Since the auxiliary polarizer for white 90 is near the light source 1 or between the B-transmission RG-reflection dichroic mirror 6 and the light source 1, this polarizer 90 functions as an auxiliary polarizer for R, G and B light, which implies that the number of optical components can be decreased and the cost can be reduced. The auxiliary polarizer for white 90 should be reflective for the following reason. It must receive all of R, G and B light and for black image display, receives rays returning from the reflection liquid crystal panels 111, 112, 113 again, namely a large quantity of light energy. If it should be absorptive, its performance might be deteriorated by this light energy.

Figure 14:
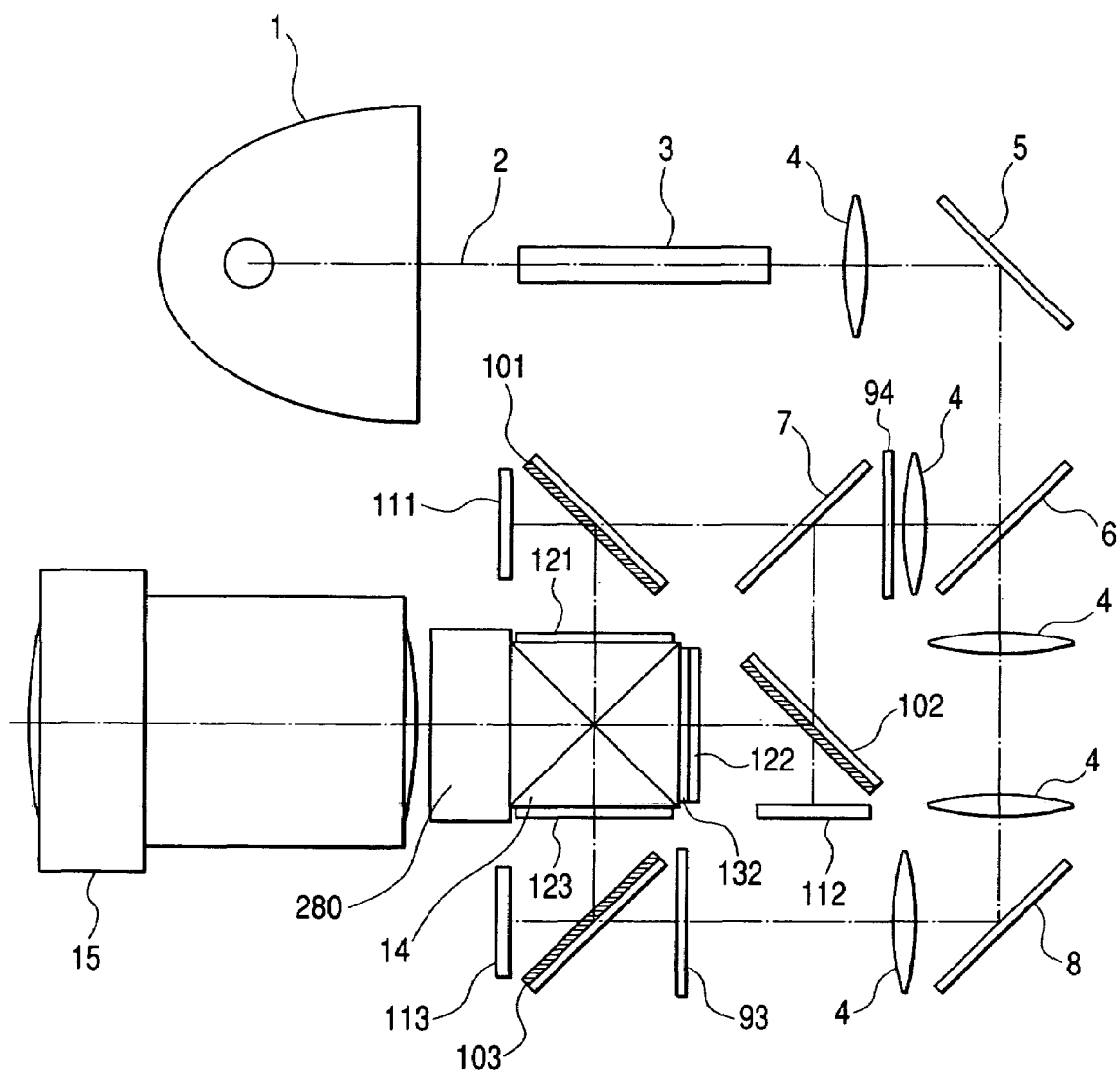
FIG. 14 shows the structure of a reflection type liquid crystal projector optical unit according to an eleventh embodiment of the present invention.

FIG. 14 shows a projector optical unit according to another embodiment of the present invention.

In FIG. 14, 94 represents an auxiliary polarizer for RG and 280 a spacer prism for white.

This embodiment replaces two auxiliary polarizers 91, 92 used in the embodiment of FIG. 2 by one auxiliary polarizer for RG 94, which implies that the number of components can be decreased and the cost can be reduced. It has a spacer prism for white 280 between the cross dichroic prism 14 and the projection lens 15. With this spacer prism for white 280, the distance between the projection lens 15 and the reflection liquid crystal panel for R 111 or the reflection liquid crystal panel for B 113 can be increased so that interference between the projection lens 15 and the structural components holding the reflection liquid crystal panel for R 111 and the reflection liquid crystal panel for B 113 can be prevented. As compared with another structure where an optical component other than the spacer prism for white 280 is used in the same position and there is an air gap in place of the spacer prism, the optical distance is shorter in the structure with the spacer prism 280 because of the spacer prism refractive index. For this reason, the necessity for a larger projection lens 15 due to a longer back focus is minimized.

In this structure, the necessity for a larger projection lens 15 is minimized, the number of optical components can be decreased and the auxiliary polarizer for RG should be reflective as in the case of the embodiment of FIG. 13.

Figure 15:
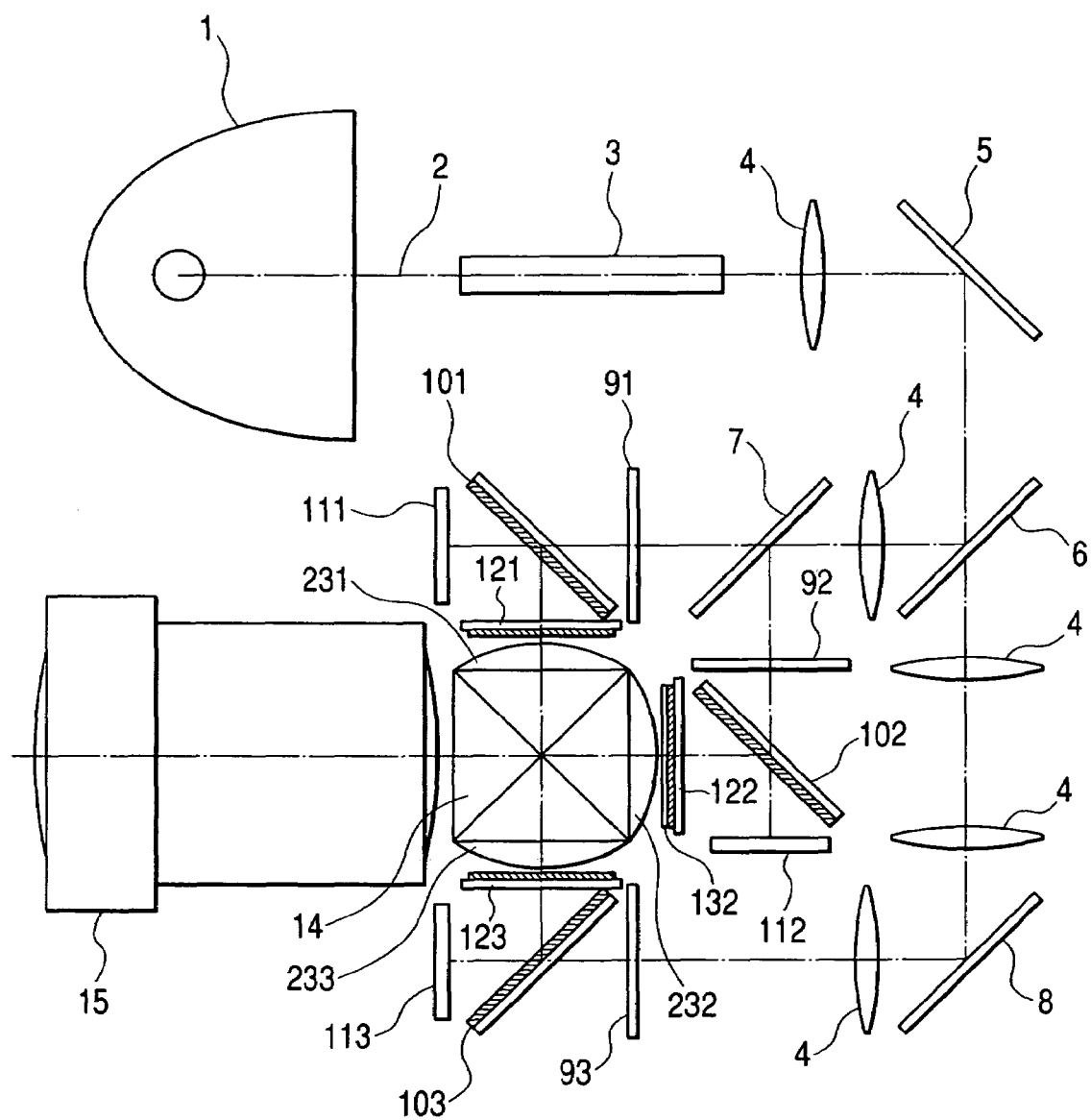
FIG. 15 shows the structure of a reflection type liquid crystal projector optical unit according to a twelfth embodiment of the present invention.

FIG. 15 shows a projector optical unit according to another embodiment of the present invention.

In FIG. 15, 231, 232, and 233 represent a projection lens auxiliary lens for R, a projection lens auxiliary lens for G, and a projection lens auxiliary lens for B, respectively. Since the center of each of the lenses coincides with the optical axis of the projection lens 15, they serve as the rear element of the projection lens 15.

In this structure, the projection lens auxiliary lenses 231, 232, 233 may be considered as part of the projection lens 15. The back focus of the projection lens integrated with these lenses 231, 232, 233 corresponds to the optical distance between the projection lens auxiliary lenses 231, 232, 233 and the reflection liquid crystal panels 111, 112, 113. Therefore, the back focus can be shortened and thus the focusing performance of the projection lens 15 can be improved.

FIG. 16 shows a projector optical unit according to another embodiment of the present invention.

In FIG. 16, 1 represents a light source; 2 the optical axis of a reflection liquid crystal projector optical unit; 24 an integrator consisting of two multi-lenses; 25 a polarization converter consisting of a PBS array and a half-wave plate; and 26 a lens which projects the shape of the lens cells (not shown) of the light source side multi-lens of the integrator 24 on the reflection liquid crystal panels 111, 112, 113. Numeral 5 represents a white reflection mirror; 90 an auxiliary polarizer for white; and 100 a reflection polarizing plate for white. Numeral 29 represents a Philips prism; 111, 112, and 113 a reflection liquid crystal panel for R, a reflection liquid crystal panel for G, and a reflection liquid crystal panel for B; 120 an auxiliary analyzer for white, respectively; 30 a quarter-wave plate for white; and 15 a projection lens.

Next, referring to FIG. 16, an explanation is given below of how a reflection type liquid crystal projector optical unit according to the present invention works for white image display. In FIG. 16, rays coming from the light source 1 are transmitted through the integrator 24, and through the polarization converter 25 and p-polarized. They are bent 90 degrees by the white reflection mirror 5 and transmitted through the auxiliary polarizer for white 90 and through the reflection polarizing plate 100 (because they are p-polarized) before reaching the Philips prism 29. In the Philips prism 29, the white light rays are separated into R, G, and B light rays, which reach the reflection liquid crystal panels 111, 112, and 113, respectively. The rays reflected (s-polarized) by the respective reflection liquid crystal panels are combined into white light inside the Philips prism 29. Since they are s-polarized, they are bent 90 degrees by the reflection polarizing plate for white 100, then transmitted through the auxiliary analyzer for white 120, and through the quarter-wave plate for white 30 and projected on the screen (not shown) in enlarged form by the projection lens 15.

In the above case, multi-lenses are used for the integrator. However, obviously another type of integrator, such as a light pipe or rod lens, may be used.

Although this embodiment uses the reflection polarizing plate 100, the use of a reflection polarizing prism instead of it would shorten the back focus of the projection lens 15 and thereby improve the focusing performance. Like the above-mentioned embodiments, this embodiment provides an optical unit which provides high contrast and excellent image focusing performance. This structure uses one reflection polarizing plate as a polarizer/analyzer for R, G, and B light so the number of components can be decreased. Also, since the light path is shared, the need for a relay light path is eliminated and thus a compact optical unit can be realized.

FIG. 17A shows a projector optical unit according to another embodiment of the present invention.

In FIG. 17A, 62 represents a GB-transmission R-reflection dichroic mirror; 80 an R-reflection mirror; and 72 a B-transmission G-reflection dichroic mirror.

Referring to FIG. 17A, rays emitted along the Z-axis from the light source 1 are transmitted through the multi-lenses 24, and p-polarized by the polarization converter 25 before reaching the GB-transmission R-reflection dichroic mirror 62 where GB rays are transmitted and R rays are reflected and bent 90 degrees toward the X-axis. Then the GB rays reach the B-transmission G-reflection dichroic mirror 72 where G rays are reflected, bent 90 degrees and cast on the auxiliary polarizer for G 92 and the B rays are transmitted and cast on the auxiliary polarizer for B 93. The R rays reflected by the GB-transmission R-reflection dichroic mirror 62 are bent 90 degrees by the R-reflection mirror 80 and cast on the auxiliary polarizer for R 91. The remaining sequence is the same as that of the embodiment of FIG. 2 and its explanation is omitted.

The center of each of the optical components is almost on the XZ plane including the optical axis 2, and the longer sides of the reflection liquid crystal panels 111 and 113 are along the Y axis while their shorter sides are along the X axis. The reflection liquid crystal panel 112 is parallel to the YZ plane and its longer side is along the Y axis and its shorter side is along the X axis.

Regarding the light-transmitting surface of the cross dichroic prism 14 in this structure, its loner side is in the direction of the normal of the dichroic main incidence plane (Y axis), so that the size of the cross dichroic prism 14 can be minimized. The back focus of the projection lens 15 is made the shortest, making it possible to minimize the sizes of the reflection polarizing plates 101, 102, 103 and other optical components. Therefore, the cost can be reduced and the projection lens 15 can be compact.

Furthermore, this embodiment is designed so that rays emitted from the polarization converter 25 are p-polarized, and B rays pass through the two dichroic mirrors 62 and 72. Generally speaking, the transmittance of an optical component like a lens or polarizing plate is lower for B rays than for R and G rays. Particularly, for a reflection type image display apparatus, which tends to have many optical components, this problem has a considerable influence, possibly causing white color imbalance due to lack of B rays. Also, generally the transmittance of a dichroic mirror is higher for p-polarized light than for s-polarized light. Accordingly, with this structure, the efficiency of utilization of B light is increased, and the required amount of reduction of G and R light, associated with the reduction of B light for improvement in white image color balance or for color balancing, can be decreased, thereby leading to higher light utilization efficiency. Generally, the transmittance of a cross dichroic prism for B light (92%) is lower than that for G light and R light (prism transmittance refers to the ratio of the quantity of incoming light to a prism to the quantity of outgoing light from it, where the reflected light path in the prism is involved). The cross dichroic prism 14 used in this embodiment is designed with priority on B light and the transmittance for B light is as high as 95%. So, the prism's transmittance for G light and B light is lower than an ordinary prism's. However, it does not matter because the required amount of reduction of R light and G light is decreased. Due to the increase in the quantity of B light, the required amount of reduction of R light and G light can be further decreased, resulting in improvement in the overall light utilization efficiency.

In this embodiment, regarding the lens 26, a lens nearest to the reflection liquid crystal panel 111 in the relay light path, its parts which are along the X axis (the direction of the shorter side of the panel 111, a panel near to the reflection liquid crystal panel for G 112) and do not transmit light are cut out. This lens shape prevents interference between the lens and the reflection liquid crystal panel for G 112 when the size of the optical components and optical unit is minimized, so that the lens may be located near the auxiliary analyzer for R 91. Therefore, the light path length from the focus position (not shown) of a rectangular image in the relay light path to the lens 26 (nearest to the reflection liquid crystal panel for R 111) can be increased and also the light path length from the lens 26 to the reflection liquid crystal panel for R 111 can be decreased. Consequently, the efficiency of utilization of R light can be improved for the reasons explained in connection with FIG. 10 and FIG. 11.

In this embodiment, the projection lens 15 has cutout portions on its incidence plane side, which are physically near the reflection liquid crystal panel for R 111 and the reflection liquid crystal panel for B 113 and do not transmit light. FIG. 17B shows the incidence plane of the projection lens 15 (parallel to the XY plane perpendicular to the optical axis 2) as viewed from the cross dichroic prism 14. In FIG. 17B, 34 represents the lens area of the projection lens 15 which is nearest to the entrance side (the side of the cross dichroic prism 14); 32 the area on which light from the cross dichroic prism 14 impinges; 33 the projection lens cutout portions which are on the entrance side. This is an embodiment of the present invention in the form of a front projection type image display apparatus optical unit. Here, the center of the projection lens 15 is above the center of the image light (in the X axis direction) so that an image is projected upward (in the X axis direction) without being distorted. For this reason, the upper and lower cutout portions 33 are different in size. Thanks to this form of projection lens 15, it is possible to prevent interference between the projection lens 15 and the reflection liquid crystal panel for R 111 or the reflection liquid crystal panel for B 113 when the size of the optical components or optical unit is minimized. As a result, the projection lens 15 may be located very near the exit plane of the cross dichroic prism 14, which means that the back focus of the projection lens 15 can be shortened and the focusing performance of the lens 15 can be improved.

As discussed so far, in an optical unit based on a reflection type image display device according to the present invention and a projection type image display apparatus which uses it, light leakage associated with black image display is reduced by using a reflection polarizing plate which functions as a polarizing plate by its grating function only in a specific direction, an auxiliary polarizer and an absorption auxiliary analyzer and the possibility of interference between the projection lens and the structural component holding the reflection image display device is eliminated, so that contrast is improved and the number of components (brightness improvement) is decreased without resolution deterioration.

What is claimed is:

1. A projection type image display apparatus, comprising:
   a light source;
   an integrator;
   a first dichroic mirror which transmits a first color light and reflects second and third color lights;
   a first reflection image display device for the first color from the first dichroic mirror;
   a second reflection image display device for the second color;
   a third reflection image display device for the third color;
   a dichroic prism for combining the first, second and third color lights from the first, second and third reflection image display devices;
   a projection lens;
   a first reflection polarizing plate located before or after the first reflection image display device on a first light path, the first light path being from the first dichroic mirror to the projection lens via the first reflection image display device, the first reflection polarizing plate comprising a working surface which rotates the first light reflected by the first reflection image display device in a specific direction;
   a first auxiliary polarizer located between the light source and the first reflection polarizing plate on the first light path;
   a first auxiliary analyzer as an absorption polarizing plate located between the first reflection polarizing plate and the projection lens; and
   a first relay lens located on the first path for refocusing an image formed by the integrator.

2. A projection type image display apparatus according to claim 1, further comprising:
   a second relay lens located on the first path for refocusing an image is formed by the integrator,
   wherein an optical path length from the first reflection image display device to the first relay lens is more than twice of an optical path length from the first reflection image display device to the second relay lens.

3. A projection type image display apparatus according to claim 1, wherein
   an incident angle from the integrator to the first dichroic mirror is less than 45 degree.

4. A projection type image display apparatus according to claim 3, further comprising:
   a reflection mirror which located between the first dichroic mirror and the first reflection polarizing plate and of which incident angle being less than 45 degree.

5. A projection type image display apparatus according to claim 3, further comprising:
   a second dichroic mirror which transmits the second color light and reflects the third color light and of which incident angle from the first dichroic mirror being less than 45 degree.

6. A projection type image display apparatus according to claim 5, further comprising:
   a second auxiliary polarizer located between the light source and the second reflection polarizing plate;
   a second auxiliary analyzer located between the second reflection polarizing plate and the projection lens;
   a third auxiliary polarizer located between the light source and the third reflection polarizing plate; and
   a third auxiliary analyzer located between the third reflection polarizing plate and the projection lens.

* * * * *